United States Patent
Kodani et al.

(10) Patent No.: US 7,054,746 B2
(45) Date of Patent: May 30, 2006

(54) NAVIGATOR

(75) Inventors: Kiyoshi Kodani, Tottori (JP); Hiroshi Tanaka, Tottori (JP); Takashi Sugai, Tottori (JP); Isao Umezawa, Tottori (JP); Hidenori Kadono, Tottori (JP); Yuichi Abe, Tottori (JP); Kazuhiro Nakashima, Tottori (JP); Shinji Takuno, Tottori (JP); Tsutomu Taguchi, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 10/468,402

(22) PCT Filed: Mar. 4, 2002

(86) PCT No.: PCT/JP02/01986

§ 371 (c)(1),
(2), (4) Date: Aug. 29, 2003

(87) PCT Pub. No.: WO02/075252

PCT Pub. Date: Sep. 26, 2002

(65) Prior Publication Data

US 2004/0117109 A1   Jun. 17, 2004

(30) Foreign Application Priority Data

Mar. 21, 2001 (JP) .............................. 2001-080956
Mar. 26, 2001 (JP) .............................. 2001-087900
Jun. 18, 2001 (JP) .............................. 2001-183711

(51) Int. Cl.
  *G01C 21/34* (2006.01)
(52) U.S. Cl. .................. 701/212; 701/211; 340/995.15

(58) Field of Classification Search ................ 701/200, 701/207, 208, 211, 212; 340/995.14, 995.15
See application file for complete search history.

(56) References Cited

U.S. PATENT DOCUMENTS

| | | | | |
|---|---|---|---|---|
| 5,699,255 A | * | 12/1997 | Ellis et al. ................... | 701/212 |
| 5,951,622 A | * | 9/1999 | Nomura ...................... | 701/212 |
| 6,567,744 B1 | * | 5/2003 | Katayama et al. .......... | 701/209 |
| 6,587,787 B1 | * | 7/2003 | Yokota ........................ | 701/212 |
| 6,647,336 B1 | * | 11/2003 | Iwata .......................... | 701/208 |
| 6,714,863 B1 | * | 3/2004 | Katayama et al. .......... | 701/209 |
| 6,714,864 B1 | * | 3/2004 | Odamura .................... | 701/212 |
| 6,732,049 B1 | * | 5/2004 | Sato et al. ................... | 701/212 |

FOREIGN PATENT DOCUMENTS

| | | |
|---|---|---|
| JP | 2-79200 | 3/1990 |
| JP | 4-227127 | 8/1992 |
| JP | 10-103993 | 4/1998 |
| JP | 10-300486 | 11/1998 |
| JP | 11-38872 | 2/1999 |
| JP | 2000-28371 | 1/2000 |
| JP | 2001-027538 | 1/2001 |
| JP | 2001-059725 | 3/2001 |
| JP | 2001-14721 | 5/2001 |
| JP | 2002-5670 | 1/2002 |
| JP | 2002-202144 | 7/2002 |

* cited by examiner

Primary Examiner—Gary Chin
(74) Attorney, Agent, or Firm—Arent Fox PLLC

(57) ABSTRACT

A navigator receives, through communication with a server, only such map information or locality information as is considered to be necessary, and stores it by overriding with it already used map information and locality information. Thus, the navigator, despite having a small storage capacity, is free from interruption of display. Receiving minimum needed information helps save the communication charge.

4 Claims, 19 Drawing Sheets

| 1 | ⊢—⊣ 64 km | ···ONLY MAIN EXPRESSWAYS AND TOLL ROADS |
| 2 | ⊢—⊣ 16 km | ···DOWN TO MAIN NATIONAL ROADS |
| 3 | ⊢—⊣ 4 km | ···DOWN TO NATIONAL AND PREFECTURAL ROADS |
| 4 | ⊢—⊣ 2 km | ···DOWN TO NATIONAL AND PREFECTURAL ROADS |
| 5 | ⊢—⊣ 1 km | ···DOWN TO COMMON ROADS |
| 6 | ⊢—⊣ 500m | ···DOWN TO COMMON ROADS |
| 7 | ⊢—⊣ 200m | ···DOWN TO TOWN STREETS |
| 8 | ⊢—⊣ 100m | ···DOWN TO TOWN STREETS |
| 9 | ⊢—⊣ 50m | ···DOWN TO BUILDING SHAPES |
| 10 | ⊢—⊣ 25m | ···DOWN TO BUILDING SHAPES |

30

NAVIGATOR

CROSS-REFERENCE TO RELATED APPLICATION

This application is a National Stage entry of International Application No. PCT/JP02/01986 filed Mar. 4, 2002.

TECHNICAL FIELD

The present invention relates to a navigator that receives map information and locality information through communication.

BACKGROUND ART

Known as conventional navigators are apparatuses that are so configured as to acquire the information of the current location by the use of a current location detecting means, such as a GPS (global positioning system) receiver, then read out map information stored in a storage means, such as a CD-ROM, and then display a map around the current location on a displaying means, such as a monitor, and indicate the current location by the use of a guiding means, such as by displaying it or telling it with voice.

Some navigators can receive the latest, detailed map information and locality information through communication achieved by means of FM multiplex broadcast, known as the VICS (vehicle information and communication system) service, or by means of radio beacons or optical beacons, or by other means.

Other navigators under development incorporate, for compactness and light weight, a compact storage medium, such as a Smart Media card, Compact Flash card, Memory Stick, or SD card, instead of a disk drive, such as a CD-ROM or DVD-ROM drive. Since such compact storage media have small storage capacities, with navigators incorporating them, it is essential to receive map information or locality information through communication in a manner as described above.

For example, Japanese Patent Application Laid-Open No. 2000-67385 discloses a navigator that acquires from a map center only such information as is currently needed and that then displays it. This navigator does not require a memory for the storage of currently unnecessary map information, and keeps acquiring the latest map information.

However, even though information can be acquired through communication in a manner as described above, the navigator has only a small storage capacity, and therefore receiving large-scale, detailed map information and locality information all the time increases the frequency of reception, resulting in a high charge for communication. Moreover, receiving both map information and locality information increases the amount of information, increasing the frequency of reception and thus the charge for communication.

Moreover, even though information can be acquired through communication in a manner as described above, since the navigator has a small storage capacity, it is necessary to receive information periodically. If, when there is a need to receive information, the navigator happens to be located in an area where communication is impossible, as in a tunnel, the information being received is interrupted.

Moreover, according to Japanese Patent Application Laid-Open No. 2000-67385 mentioned above, the map information of not only the map area of the current location but also all the map areas adjacent thereto is kept acquired. Thus, the map information of already traveled locations and such map information as is highly unlikely to be used is also kept acquired unnecessarily. This method, therefore, is too inefficient to be applied to a navigator having a limited storage capacity. Specifically, when the navigator happens to be traveling an area where communication is impossible, the map information being received is highly likely to be interrupted.

DISCLOSURE OF THE INVENTION

An object of the present invention is to provide a navigator that receives a minimum of information needed and that thus, by reducing the amount of information received, saves the charge for communication. Another object of the present invention is to provide a navigator that prevents interruption of information by receiving map information and locality information before communication becomes impossible. Still another object of the present invention is to provide a navigator that, by receiving only needed information without increasing the storage capacity, reduces the likeliness of map information being interrupted in an area where communication is impossible.

To achieve the above objects, according to one aspect of the present invention, in a navigator including receiving means for receiving map information through communication, displaying means for displaying the map information received by the receiving means with the current location superimposed thereon, and controlling means for controlling the receiving means and the displaying means, through control by the controlling means, the receiving means receives, out of map information composed of a plurality of maps on different scales, map information on a scale corresponding to the type of road currently being traveled, and the displaying means displays the map information and the current location in a superimposed form.

In this way, the receiving means receives, out of map information composed of a plurality of maps on different scales, map information on a scale corresponding to the type of road currently being traveled, and the displaying means displays the map information and the current location in a superimposed form. This makes it possible to receive map information on as small a scale as possible on which only a minimum of roads needed for traveling are shown. This helps reduce the amount of information received and thereby save the charge for communication.

When there is a branch point within a predetermined area ahead of the current location, the receiving means may receive map information on a predetermined scale including the branch point so that the displaying means can display the map information and the current location in a superimposed form. This makes it possible to display map information on a large scale near a branch point while otherwise displaying a map on a small scale. This helps present needed map information in an easy-to-read fashion while saving the charge for communication.

Such a branch point may be limited to one at which the planned route is supposed to turn. This makes it possible to display map information on a large scale near a branch point at which the planned route is supposed to turn while otherwise displaying a map on a small scale. This helps present needed map information in an easy-to-follow fashion while saving the charge for communication.

According to another aspect of the present invention, in a navigator including receiving means for receiving map information and locality information through communication, displaying means for displaying the information received by the receiving means with the current location superimposed thereon, and controlling means for controlling the receiving means and the displaying means, through control by the controlling means, the navigator operates in one of: a first state in which the receiving means receives, out of map information composed of a plurality of maps on different scales, map information on a scale corresponding to the type of road currently being traveled, and the displaying means displays the map information and the current location in a superimposed form; and a second state in which the receiving means further receives locality information corresponding to the map information, and the displaying means displays the map information, the locality information, and the current location in a superimposed form.

In this way, the navigator operates in one of: a first state in which the receiving means receives, out of map information composed of a plurality of maps on different scales, map information on a scale corresponding to the type of road currently being traveled, and the displaying means displays the map information and the current location in a superimposed form; and a second state in which the receiving means further receives locality information corresponding to the map information, and the displaying means displays the map information, the locality information, and the current location in a superimposed form. This makes it possible to receive map information on as small a scale as possible on which only a minimum of roads needed for traveling are shown and locality information corresponding to that map information. This helps reduce the amount of information received and thereby save the charge for communication.

When there is a branch point within a predetermined area ahead of the current location, the receiving means may receive map information or locality information on a predetermined scale including the branch point so that the displaying means can either display the map information and the current location in a superimposed form or display the map information, the locality information, and the current location in a superimposed form. This makes it possible to display map information or locality information on a large scale near a branch point while otherwise displaying a map on a small scale. This helps present needed information in an easy-to-follow fashion while saving the charge for communication.

Such a branch point may be limited to one at which the planned route is supposed to turn. This makes it possible to display map information or locality information on a large scale near a branch point at which the planned route is supposed to turn while otherwise displaying a map on a small scale. This helps present needed information in an easy-to-follow fashion while saving the charge for communication.

According to another aspect of the present invention, in a navigator including receiving means for receiving map information or locality information through communication and controlling means for controlling the receiving means, through control by the controlling means, when the location at which reception is scheduled to take place next is located in a poor-reception area, the receiving means receives map information or locality information in advance before entry into the poor-reception area.

In this way, map information or locality information is received before communication becomes impossible. This makes it possible to realize a navigator free from interruption of information.

The map information or locality information received before entry into the poor-reception area may be map information or locality information on such a scale as to cover at least all the poor-reception area.

According to another aspect of the present invention, in a navigator including communicating means for receiving map information through communication, storing means for storing the map information received by the communicating means, current location detecting means for detecting the current location, and controlling means for controlling the communicating means, the storing means, and the current location detecting means, through control by the controlling means, the navigator operates in one of: a state in which the communicating means receives map information of a predetermined area; a state in which the storing means stores the received map information of the predetermined area; and a state in which the storing means erases map information other than the map information of the predetermined area.

In this way, map information other than the map information of the predetermined area is erased from the storage means, and only needed map information is received and stored. This makes it possible to efficiently store map information without increasing the storage capacity. This helps keep displaying the current location longer even in an area where communication is impossible, and thus helps reduce the likeliness of map information being interrupted.

According to another aspect of the present invention, in a navigator including connecting means for connecting to communicating means capable of receiving map information through communication, storing means for storing the map information received by the communicating means, current location detecting means for detecting the current location, and controlling means for controlling the communicating means connected to the connecting means, the storing means, and the current location detecting means, through control by the controlling means, the navigator operates in one of: a state in which the communicating means connected to the connecting means receives map information of a predetermined area; a state in which the storing means stores the received map information of the predetermined area; and a state in which the storing means erases map information other than the map information of the predetermined area.

In this way, the navigator can be used with the communicating means connected thereto. This makes it possible to use a cellular phone or the like as the communicating means, and thus eliminates the need to provide the navigator with its own communicating means.

In the navigator described above, when no destination to which to navigate is set, the map information of the predetermined area may be map information covering a continuous area including the current location and extending ahead of the current location.

In the navigator described above, when a destination to which to navigate is set, the map information of the predetermined area may be, of all map information covering the planned route from the current location to the destination, map information covering a continuous area including the current location and an untraveled portion of the planned route.

In the navigator described above, when no planned route over which to navigate is set, the map information of the predetermined area may be, of all map information covering a road having the name of the road currently being traveled, map information covering a continuous area including the current location and an untraveled portion of the road.

BEST MODE FOR CARRYING OUT THE INVENTION

First Embodiment

Figure 1:
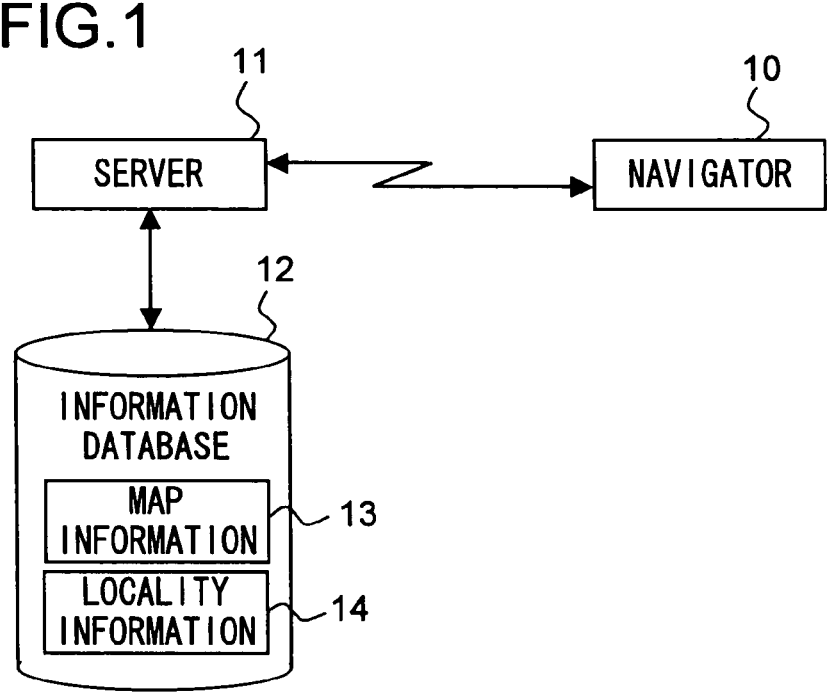
FIG. 1 is a diagram showing the configuration of a communications system employing a navigator according to the invention.

FIG. 1 is a diagram showing the configuration of a communications system employing a navigator according to the present invention. When the navigator 10 requests map information 13 or locality information 14 from a server 11, the server 11 reads out appropriate map information 13 or locality information 14 from an information database 12 according to the conditions requested by the navigator 10, and then delivers the retrieved information to the navigator 10. Here, the map information 13 is composed of a plurality of sets of map information on different scales, and the locality information 14 is so composed as to correspond to the map information 13 on those different scales.

The navigator 10 and the server 11 may communicate with each other by any means of communication so long as they can communicate with each other. For example, in a case where information is delivered over the Internet, it is possible to use a telephone network such as a mobile or cellular telephone network; in a case where information is delivered by way of the VICS service, it is possible to use FM multiple broadcast or the like.

This communications system permits the navigator 10 to receive map information 13 and locality information 14 separately. This makes it possible to receive only needed information and thereby save the charge for communication.

Figure 2:
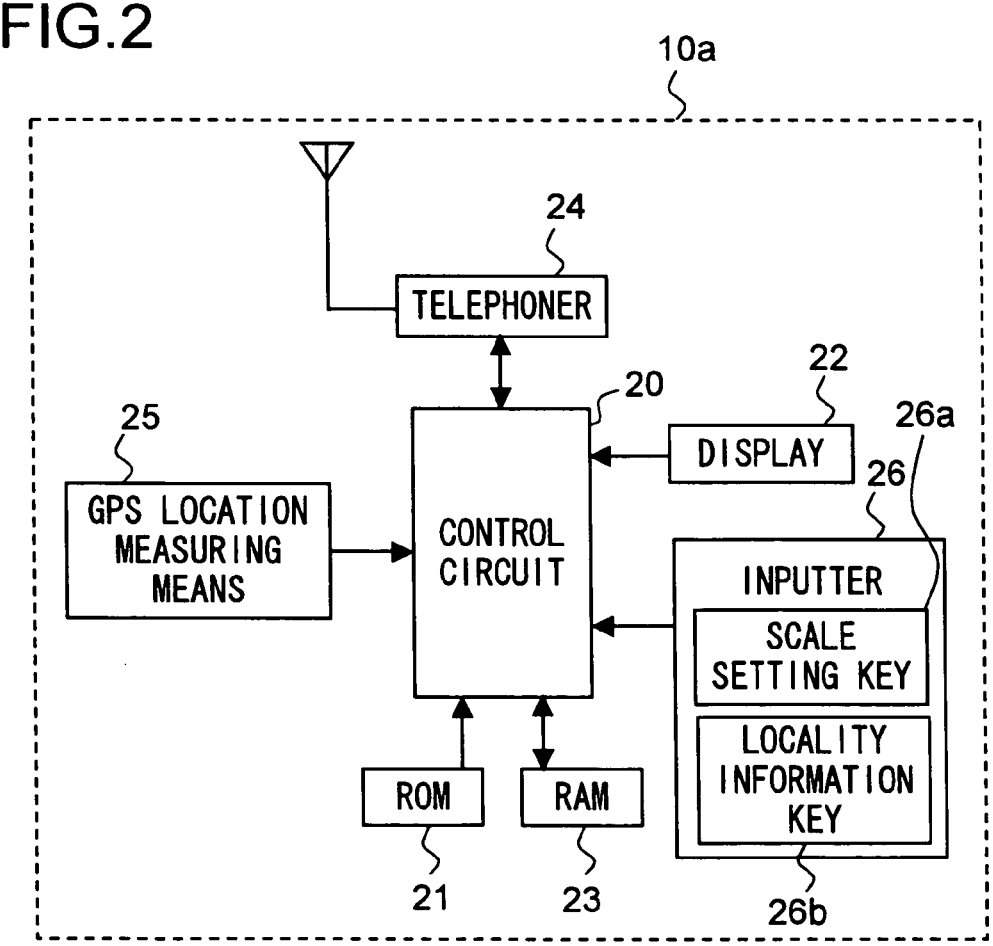
FIG. 2 is a block diagram showing the configuration of a principal portion of the navigator of a first embodiment of the invention.

FIG. 2 is a block diagram showing the configuration of a principal portion of a navigator 10a as one example of the navigator 10. First, its configuration will be described. A control circuit 20 composed of a microcomputer or the like controls the navigator 10a according to a program written to a ROM 21 in order to display map information or locality information on a liquid crystal display 22. In a RAM 23 is stored information needed for the control circuit 20 to operate. A telephoner 24 communicates with the server 11 shown in FIG. 1 to receive map information 13 or locality information 14. The received map information or locality information is separately stored in the RAM 23.

A GPS (global positioning system) location measuring means 25 measures the current location by receiving radio waves from GPS satellites, and feeds the measurement result to the control circuit 20. An inputter 26 has a scale setting key 26a that permits the user to set the scale of the map displayed and a locality information key 26b. By operating the scale setting key 26a, the user can forcibly change the scale of the map displayed, and, by operating the locality information key 26b, the user can choose whether to display locality information or not.

The capacity of the RAM 23 is determined with consideration given to the fact that, the larger the storage capacity of the RAM 23, the larger the amount of information received at a time and thus the lower the frequency of information reception, but then the more expensive the RAM 23. Instead of or in addition to the RAM 23, it is possible to use an external storage medium, such as a Compact Flash card, Memory Stick, or SD card.

In FIG. 2, the inputter 26 adopts data entry through operation of keys. It is, however, also possible to adopt a touch panel.

Through control by the control circuit 20, the navigator 10a, when it starts being used, receives the map information or locality information of and around the current location, and stores it in the RAM 23. The navigator 10a then reads out, from the RAM 23, the map information or locality information corresponding to one screen including the current location, and displays it on the display 22 with the current location, measured by the GPS location measuring means 25, superimposed thereon. During traveling, the navigator 10a continues updating the map information or locality information so that it is not interrupted, by intermittently receiving map information or locality information whenever short of information of an untraveled area and erasing the information of the already traveled area from the RAM 23 by updating it with new information while keeping the information of an untraveled area.

As necessary, it is possible to set a destination on the display 22 by operating the inputter 26. A destination can be set, for example, by first entering its address, phone number, postal area code, or the like, or entering the name of the prefecture or region in which it is located, its phone area code, or the name of a famous building, crossroads, or the like located near it, to receive the map information and locality information around the destination, and then selecting the destination itself on the map thus received. Here, immediately after a destination is set, it is also possible to receive a map that is on so small a scale that a whole area covering from the current location to the destination can be displayed within the display 22, with a planned route of travel displayed together. In addition, the expected distance and time of travel may be calculated and displayed together.

Figures 3, 4:
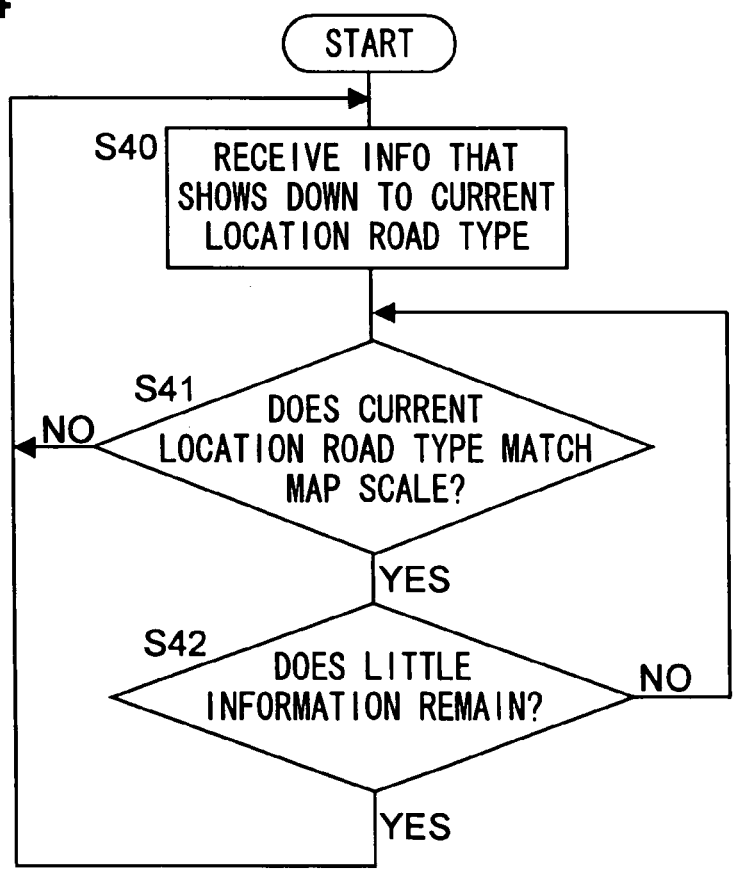
FIG. 3 is a diagram showing the scale table used in the navigator of the first embodiment.
FIG. 4 is a flow chart showing the operation of the navigator of Example 1.

When receiving map information, the control circuit 20 selects, from among a plurality of maps on different scales, a map on an appropriate scale according to the type of road currently being traveled. FIG. 3 shows a scale table 30 in which are listed the different scales on which maps are available. In the scale table 30, for example, a map on a scale of 64 km is a map that shows only main expressways and toll roads, and a map on a scale of 16 km is a map that shows, in addition to main expressways and toll roads, main national roads.

The control circuit 20 selects, for example, the smallest scale on which the type of road passing at the current location is shown on the map, or, in a case where a destination is set, the smallest scale on which all the types of roads constituting the planned route are shown on the map. For easier reading, it is advisable to display a map on a larger scale near a branch point. When receiving locality information, the control circuit 20 receives only that corresponding to the scale of the map received. Here, it is assumed that, when map information including only expressways is received, no corresponding locality information is available.

In FIG. 3, roads are classified into expressways, national roads, prefectural roads, etc. It is to be understood, however, that roads may be classified in any other manner so long as they are classified according to their width. For example, roads may be classified according to the number of lanes they have, their speed limit, or any other criterion.

The scale table 30 shown in FIG. 3 may be displayed on the display 22 to permit the user to forcibly select the desired scale on the scale table 30 by operating the scale setting key 26a. On the other hand, by operating the locality information key 26b, the user can choose whether to display locality information or not. When the locality information key 26b is so operated as to be turned off, only map information is received, and it is displayed with the current location superimposed thereon. These settings as to the scale and whether to display locality information or not can be made at any time while the navigator 10a is being used.

As described above, the navigator 10a receives map information on as small a scale as possible on which only a minimum of roads needed for traveling are shown and locality information corresponding to that map information. This helps reduce the amount of information received and thereby save the charge for communication. Now, practical examples employing this navigator 10a will be described.

Embodiment 1

Figure 5:
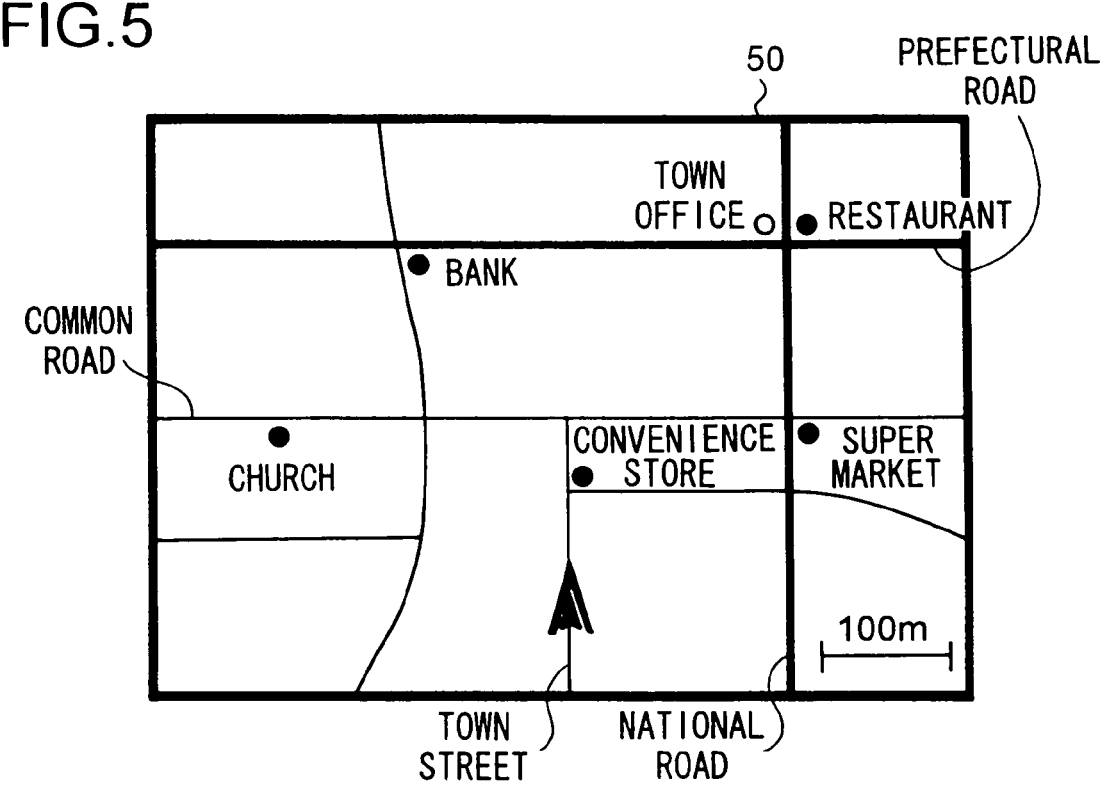
FIG. 5 is a diagram showing an image that displays map information and locality information on a scale of 100 m in Example 1.

Example 1 deals with a case where the navigator 10a is used with no destination set. FIG. 4 is a flow chart showing the operation of the navigator 10a. First, in step S40, map information or locality information on such a scale as to show the type of road passing at the current location is received and stored in the RAM 23, and then the map information or locality information is read out from the RAM 23 and displayed on the display 22 with the current location superimposed thereon. Suppose now that the current location is on a town street. Then, the control circuit 20 selects, for example, the scale of 100 m from the scale table 30 shown in FIG. 3, then receives map information or locality information on that scale, and then displays an image 50 as shown in FIG. 5. In the figure, the arrow indicates the current location.

The flow then proceeds from step S40 to step S41, where whether or not the type of road passing at the current location matches the scale of the map being displayed is checked. Here, if the town street shown in the image 50 is currently being traveled, the type of road passing at the current location, namely a town street, matches the scale of the map being displayed, namely 100 m. Thus, the flow proceeds from step S41 to step S42. In step S42, the amount of remaining information of an untraveled area is checked, i.e., whether or not the map information to be displayed next on the display 22 is stored in the RAM 23 is checked. If there remains little information of an untraveled area, the flow returns to step S40, where the stored information is updated.

Figure 6:
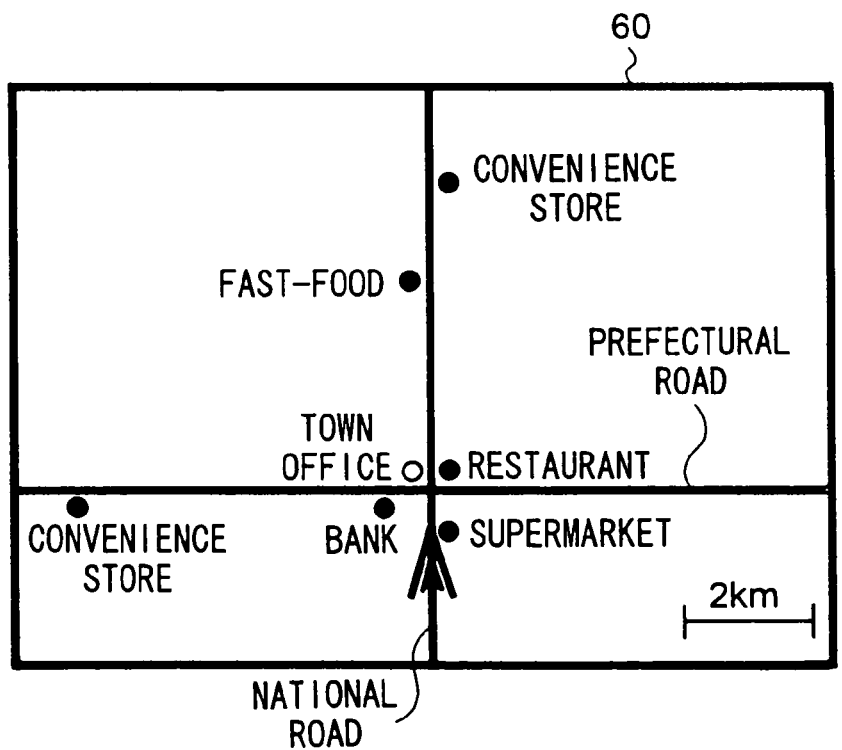
FIG. 6 is a diagram showing an image that displays map information and locality information on a scale of 2 km in Example 1.

On the other hand, if, in step S41, the national road shown in FIG. 50 is currently being traveled, the type of road passing at the current location, namely a national road, does not match the scale of the map being displayed, namely 100 m. Thus, the flow returns from step S41 to S40, where the control circuit 20 selects the scale of 2 km from the scale table 30 shown in FIG. 3, then receives map information or locality information on that scale, and then displays an image 60 as shown in FIG. 6. In the image 60, there are shown roads no smaller than national and prefectural roads; that is, there are shown no roads, such as common roads or town streets, smaller than those.

When the type of road changes from one to a larger one, it is also possible to read out a map from the RAM 23 while erasing small roads from the map information on a larger scale stored therein.

EXAMPLE 2

Figure 7:
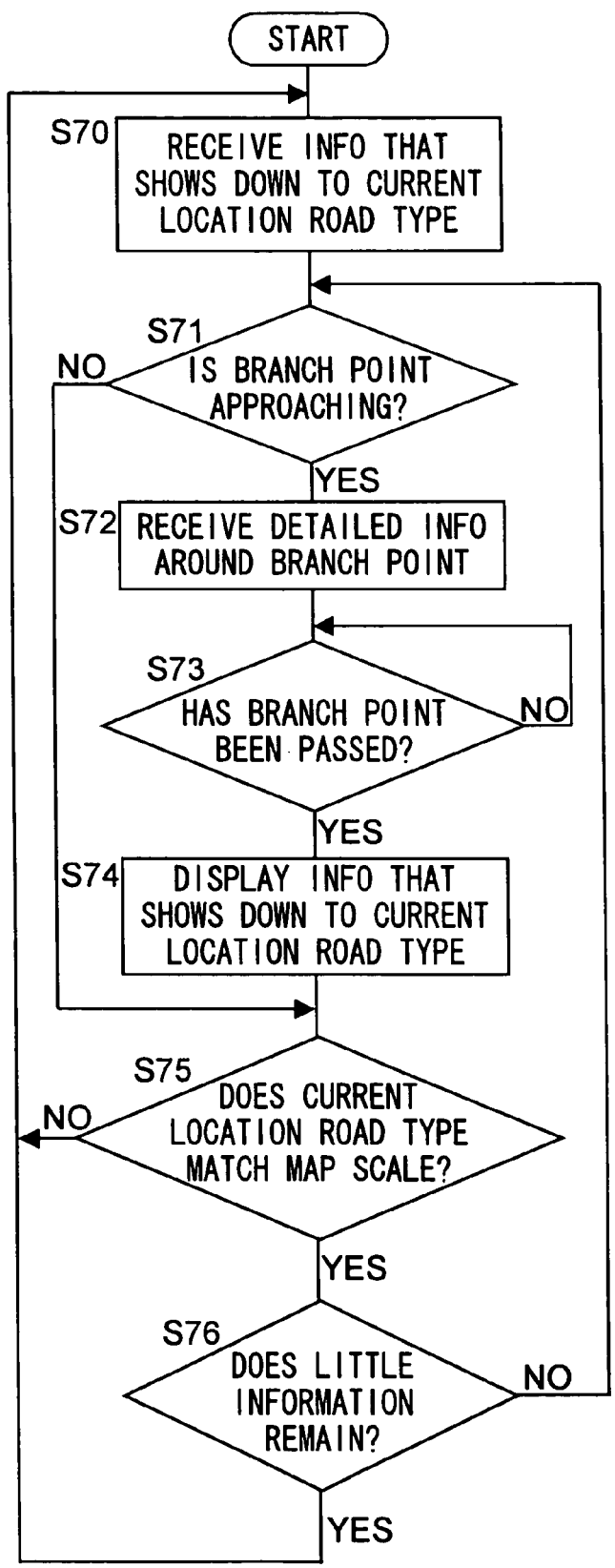
FIG. 7 is a flow chart showing the operation of the navigator of Example 2.

Example 2 deals with a navigator 10a that is just like that of Example 1 but that additionally increases the scale of the displayed map whenever a branch point is approached. FIG. 7 is a flow chart showing the operation of the navigator 10a.

Figure 8:
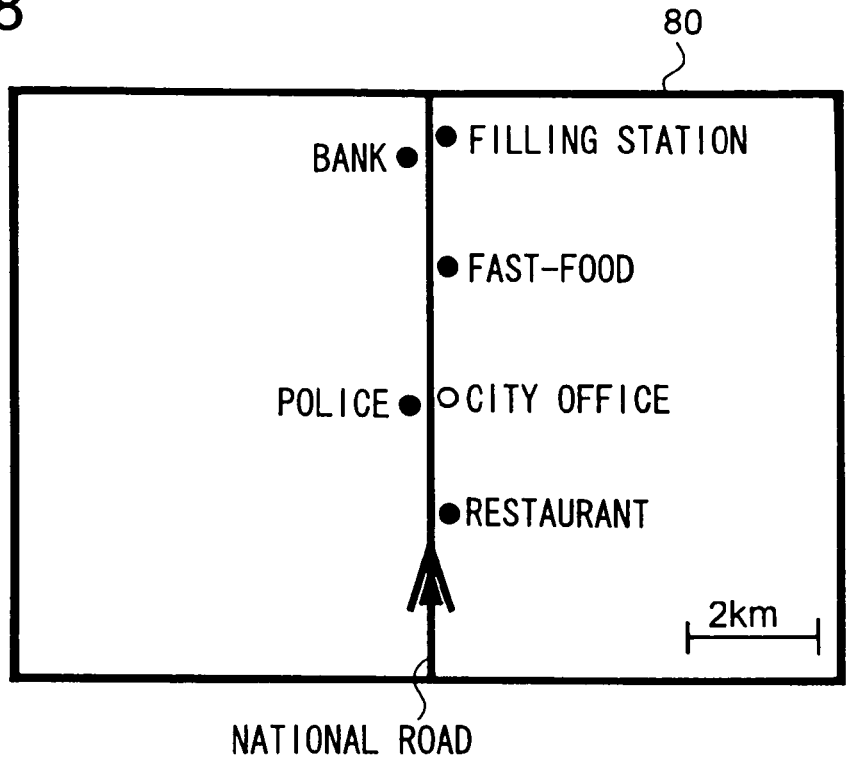
FIG. 8 is a diagram showing an image that displays map information and locality information on a scale of 2 km in Example 2.

First, in step S70, as in step S40 in Example 1, map information or locality information is displayed. Suppose now that the current location is on a national road. The, the control circuit 20 selects, for example, the scale of 2 km from the scale table 30 shown in FIG. 3, then receives map information or locality information on that scale, and then displays an image 80 as shown in FIG. 8.

The flow then proceeds from step S70 to S71, where whether or not there is a branch point within a predetermined area (for example, within 2 km) ahead of the current location is checked. If, in step S71, there is no branch point within the predetermined area ahead, then the flow proceeds to step 25, where, as in step S41 in Example 1, whether or not the type of road passing at the current location matches the scale of the map being displayed is checked. Here, if the national road shown in the image 80 is currently being traveled, the type of road passing at the current location, namely a national road, matches the scale of the map being displayed, namely 2 km. Thus, the flow proceeds from step S75 to step S76. In step S76, if there remains little information of an untraveled area, the flow returns to step S70, where the stored information is updated.

Figure 9:
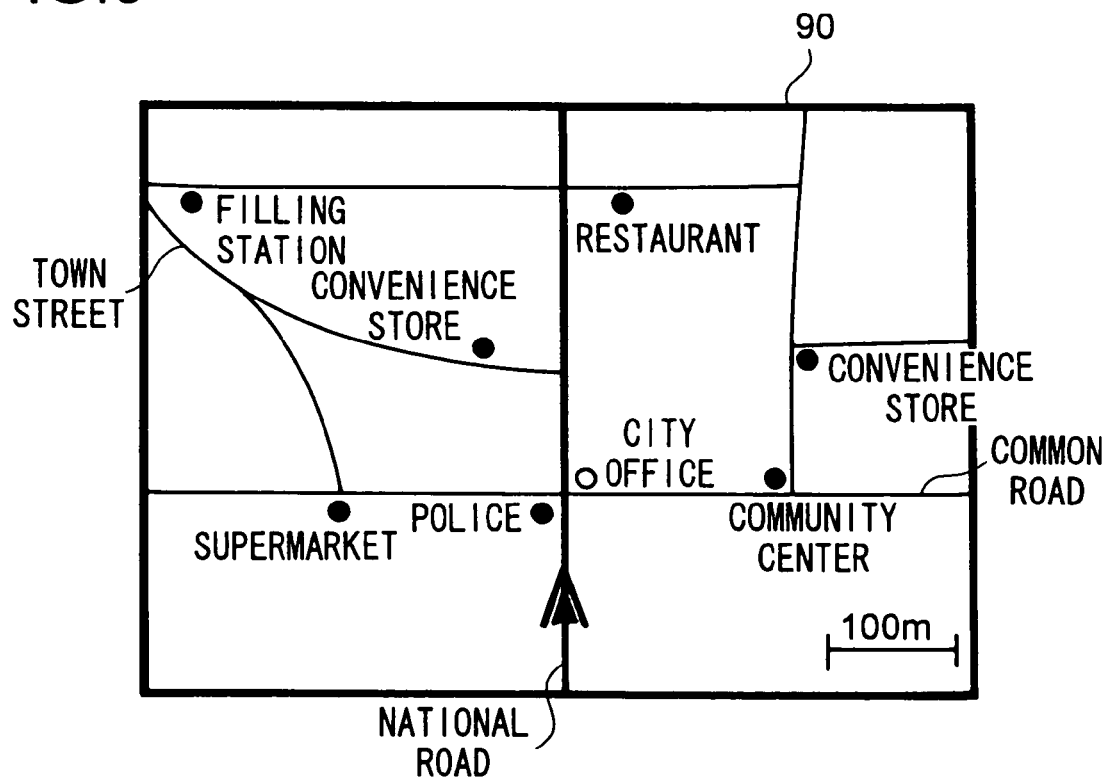
FIG. 9 is a diagram showing an image that displays map information and locality information on a scale of 100 m in Example 2.

On the other hand, if, in step S71, there is a branch point within the predetermined area ahead, then the flow proceeds to step S72, where detailed information on a larger scale around the branch point within the predetermined area ahead is received and stored in the RAM 23, and then the information is read out from the RAM 23 and displayed with the current location superimposed thereon. Here, map information or locality information, for example, on a scale of 100 m is received, and an image 90 as shown in FIG. 9 is displayed.

Thereafter, the flow proceeds to step S73, where whether or not the branch point mentioned above has been passed is checked. If the branch point has been passed, the flow proceeds from step S73 to step S74, where the display is switched back to the map information on a smaller scale that has already been received in step S70. Then, the flow proceeds to step S75.

The navigator 10a of Example 2 can display detailed, large-scale map information or locality information near a branch point while otherwise displaying a small-scale map. This helps present information in an easier-to-read manner.

EXAMPLE 3

Figure 10:
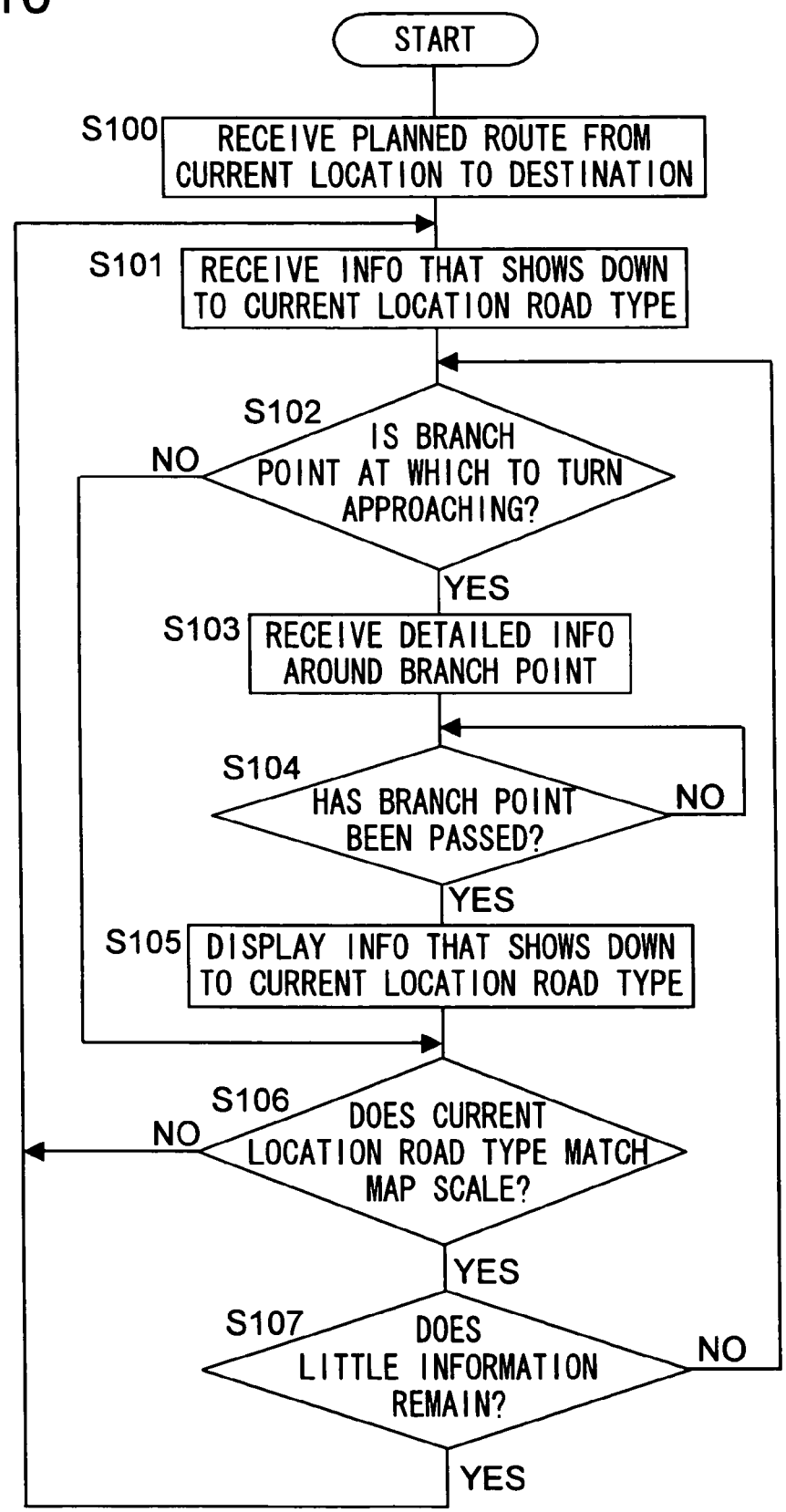
FIG. 10 is a flow chart showing the operation of the navigator of Example 3.

Example 3 deals with a case where the navigator 10a is used with a destination set; specifically, here, the navigator 10a is just like that of Example 2 but the branch point that it handles is limited to one at which the planned route is supposed to turn. FIG. 10 is a flow chart showing the operation of the navigator 10a. When a destination is set, for example, by entering a phone number by operating the inputter 26, then, in step S100, a map that is on so small a scale that a whole area covering from the current location to the destination can be displayed within the display 22 is received, and a planned route of travel is displayed.

Figure 11:
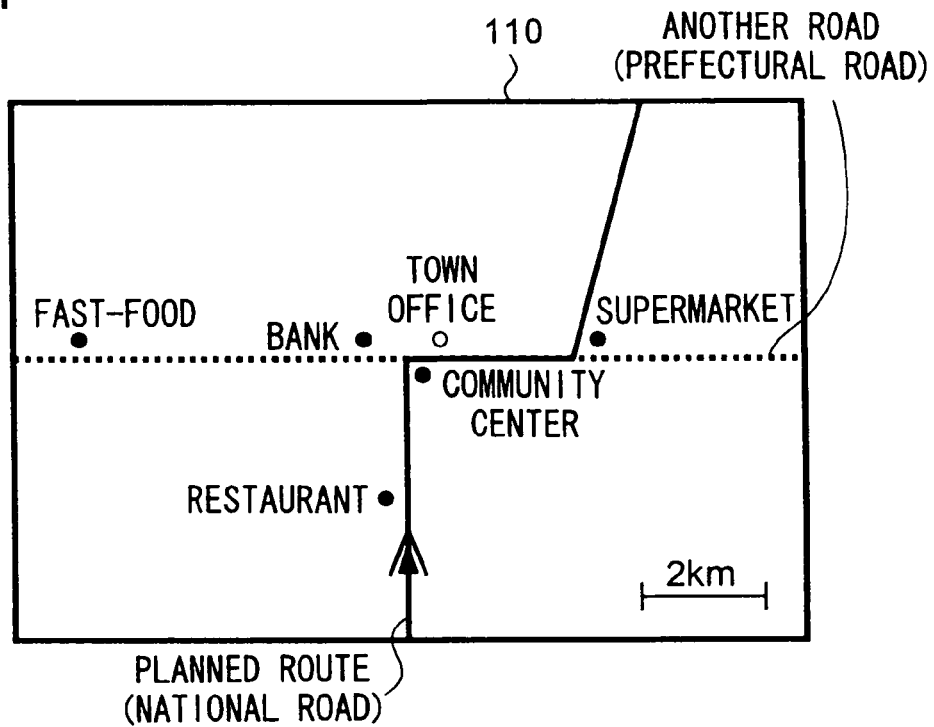
FIG. 11 is a diagram showing an image that displays map information and locality information on a scale of 2 km in Example 3.

Thereafter, the flow proceeds to step S101, where, as in step S40 in Example 1, map information or locality information is displayed. Suppose now that the current location is on a national road. The, the control circuit 20 selects, for example, the scale of 2 km from the scale table 30 shown in FIG. 3, then receives map information or locality information on that scale, and then displays an image 110 as shown in FIG. 11. In FIG. 11, the solid line indicates the planned route of travel, and the broken line indicates another road.

The flow then proceeds from step S101 to S102, where whether or not there is a branch point at which the planned route is supposed to turn within a predetermined area (for example, within 2 km) ahead of the current location is checked. If, in step S102, there is no branch point at which the planned route is supposed to turn within the predetermined area ahead, then the flow proceeds to step S106, where, as in step S41 in Example 1, whether or not the type of road passing at the current location matches the scale of the map being displayed is checked. Here, if the national road shown in the image 110 is currently being traveled, the type of road passing at the current location, namely a national road, matches the scale of the map being displayed, namely 2 km. Thus, the flow proceeds from step S106 to step S107. In step S107, if there remains little information of an untraveled area, the flow returns to step S101, where the stored information is updated.

Figure 12:
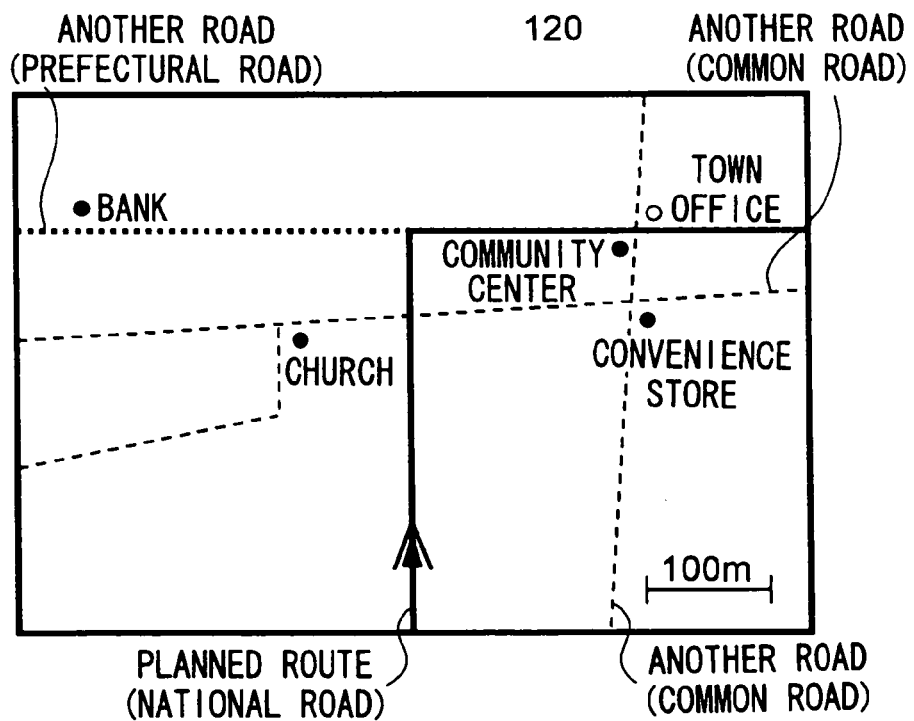
FIG. 12 is a diagram showing an image that displays map information and locality information on a scale of 100 m in Example 3.

On the other hand, if, in step S102, there is a branch point at which the planned route is supposed to turn within the predetermined area ahead, then the flow proceeds to step S103, where detailed information on a larger scale around the branch point at which the planned route is supposed to turn is received and stored in the RAM 23, and then the information is read out from the RAM 23 and displayed with the current location superimposed thereon. Here, map information or locality information, for example, on a scale of 100 m is received, and an image 120 as shown in FIG. 12 is displayed.

Thereafter, the flow proceeds to step S104, where whether or not the branch point mentioned above has been passed is checked. If the branch point has been passed, the flow proceeds from step S104 to step S105, where the display is switched back to the map information on a smaller scale that has already been received in step S101. Then, the flow proceeds to step S106.

In Example 3, when the current location deviates from the planned route, information is received and displayed according to the flow chart of Example 1 shown in FIG. 4 or the flow chart of Example 2 shown in FIG. 7. When the current location is back on the planned route, information is received and displayed according to the flow chart of Example 3 shown in FIG. 10. In this way, even if a wrong road is taken, or if an intentional departure from the planned route is taken as for a meal, it is possible to display needed information.

The navigator 10a of Example 3 can display detailed, large-scale map information or locality information near a branch point at which the planned route is supposed to turn while otherwise displaying a small-scale map. This helps present information in an easier-to-read manner while reducing the amount of information received as compared with in Example 2.

Second Embodiment

The communications system of a second embodiment of the invention is configured in the same manner as that of the first embodiment shown in FIG. 1, and therefore its detailed explanations will be omitted. The navigator 10b (not shown) of the second embodiment is a modified version of the navigator 10a of the first embodiment from which the scale setting key 26a shown in the block diagram showing the construction of a principal portion of the latter is omitted, and therefore its detailed explanations will be omitted.

Figure 13:
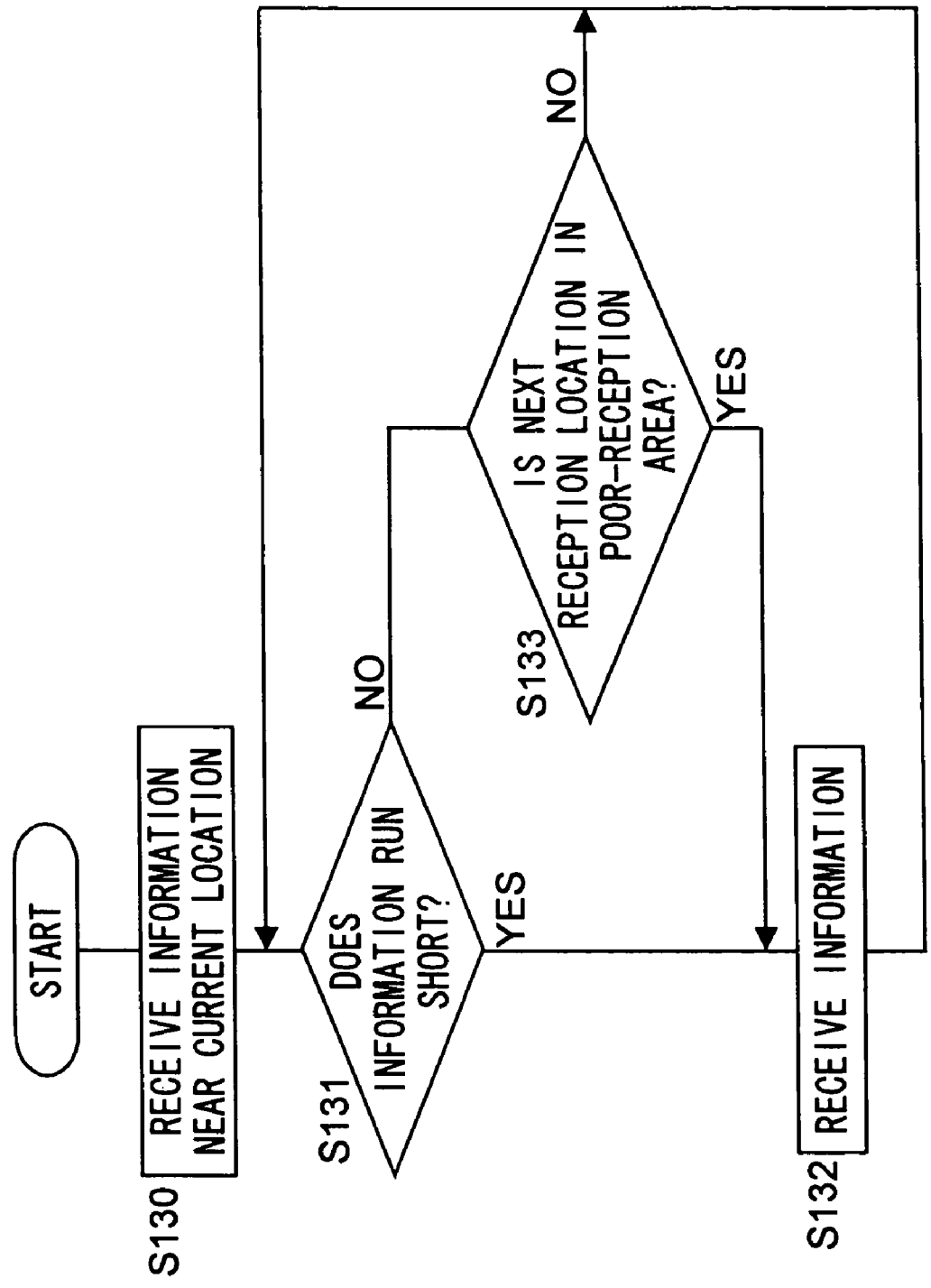
FIG. 13 is a flow chart showing the operation of the navigator of a second embodiment of the invention.
Figure 14:
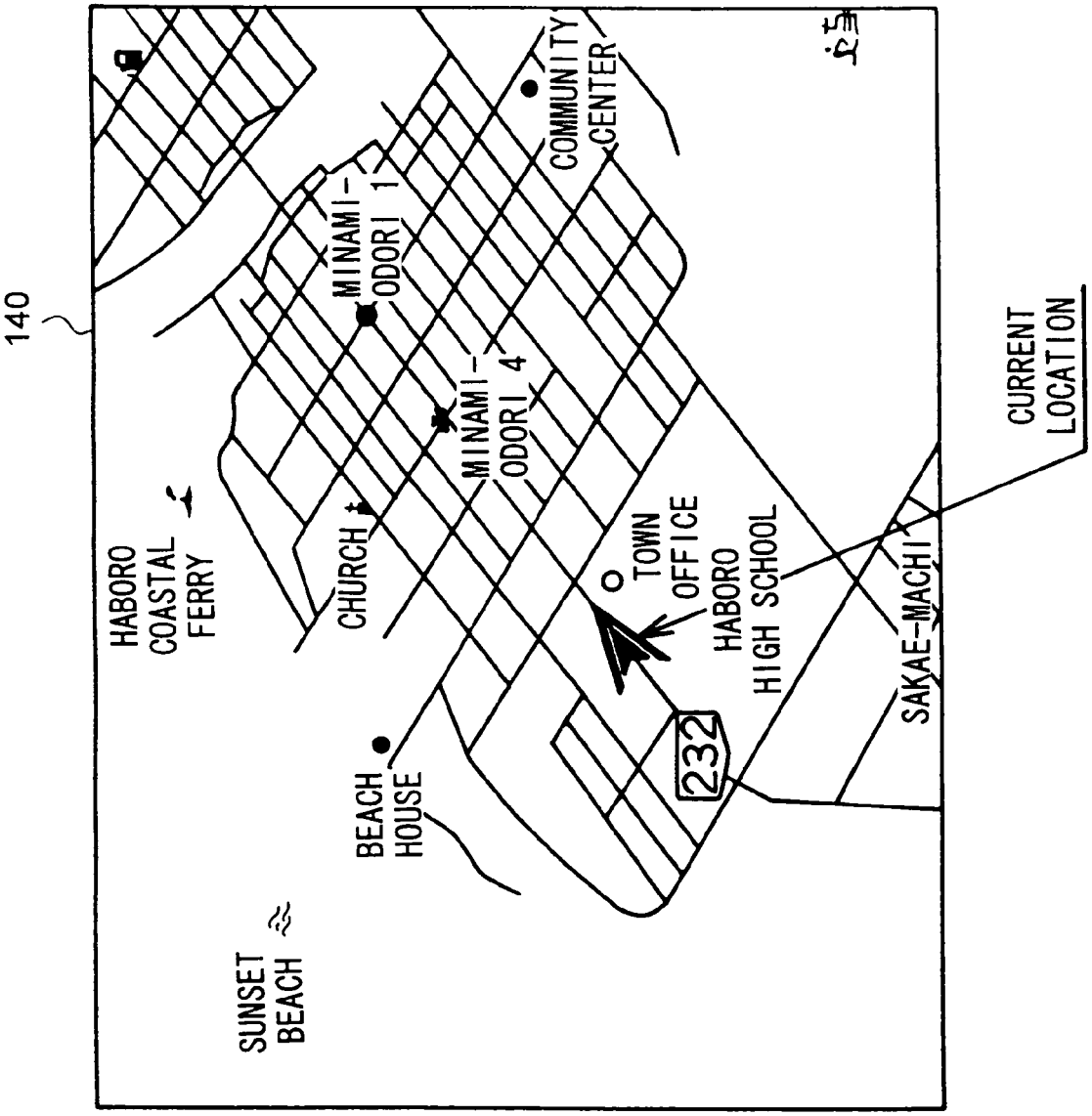
FIG. 14 is a diagram showing an image that displays map information and locality information in the navigator of the second embodiment.

FIG. 13 is a flow chart showing the operation of the navigator 10b. When power starts being supplied to the navigator 10b, in step S130, through control by the control circuit 20, map information and locality information within a predetermined area including the current location is received and stored in the RAM 23, and then the map information and locality information corresponding to one screen including the current location is read out from the RAM 23 and displayed on the display 22 with the current location, measured by the GPS location measuring means 25, superimposed thereon, in the form of an image 140 as shown in FIG. 14. In FIG. 14, the arrow indicates the current location.

As necessary, it is possible to set a destination, choose whether to display locality information or not, and make other selections on the display 22 by operating the inputter 26. A destination can be set, for example, by first entering its address, phone number, postal area code, or the like, or entering the name of the prefecture or region in which it is located, its phone area code, or the name of a famous building, crossroads, or the like located near it, to receive the map information and locality information around the destination, and then selecting the destination itself on the map thus received.

Here, immediately after a destination is set, it is also possible to receive a map that is on so small a scale that a whole area covering from the current location to the destination can be displayed within the display 22, with a planned route of travel displayed together. In addition, the expected distance and time of travel may be calculated and displayed together.

Figure 15:
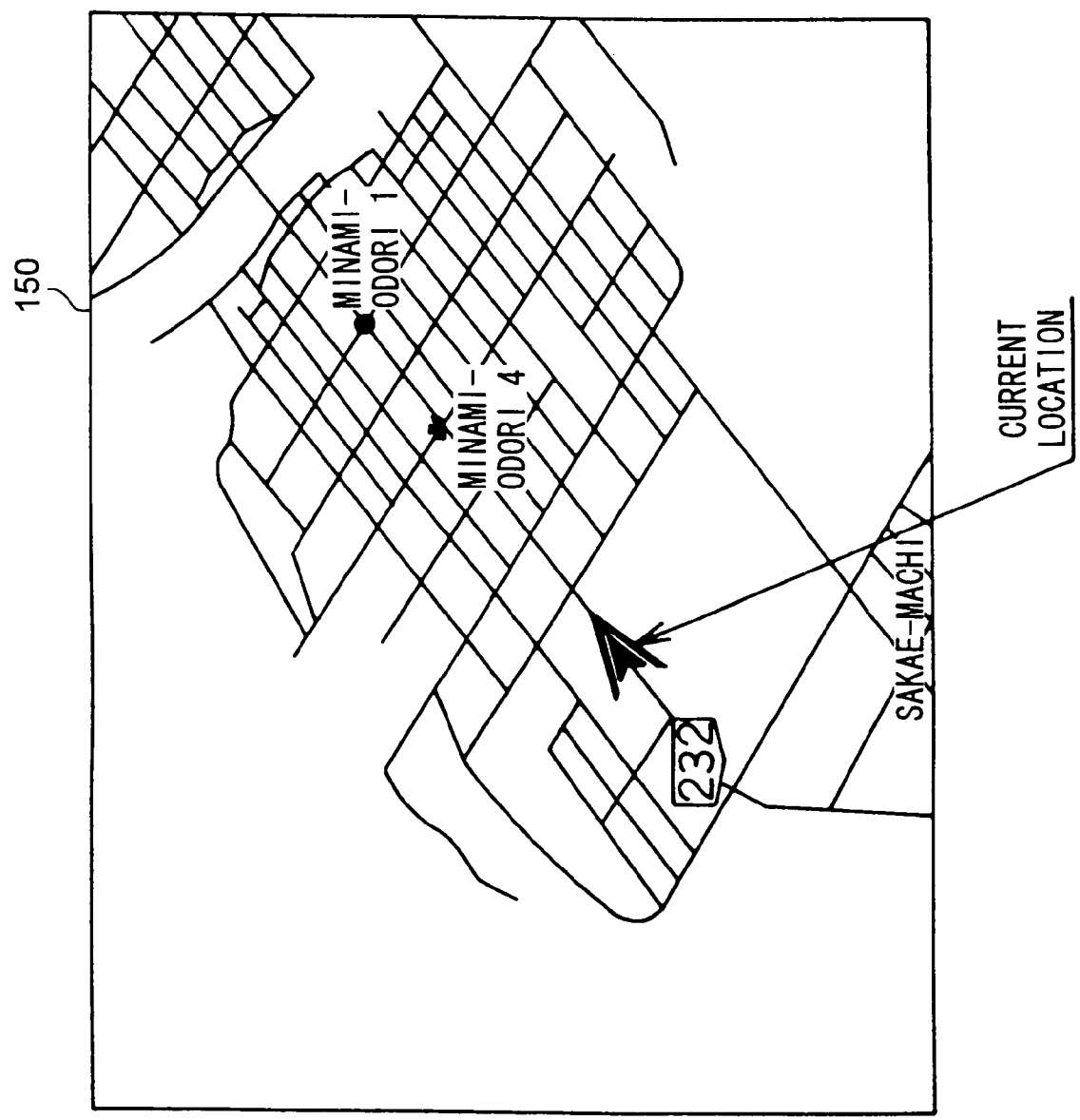
FIG. 15 is a diagram showing an image that displays map information in the navigator of the second embodiment.

On the other hand, whether to display locality information or not can be chosen at any time by turning the locality information key 26b on or off. FIG. 15 shows an image 150 displayed when the locality information key 26b is so operated as to be turned off. Here, the map information is displayed with the current location superimposed thereon, and the arrow indicates the current location. It should be noted here that, when the image 140 shown in FIG. 14, where both map information and locality information is displayed, is being displayed, operating the locality information key 26b so as to turn it off causes the locality information to be erased from the image 140, switching the display to the image 150 shown in FIG. 15, but, here, the locality information is erased only from the screen and remains stored in the RAM 23. Accordingly, when the locality information key 26b is operated again so as to be turned on before the information stored in the RAM 23 is updated, the locality information is readily displayed again without new reception.

On completion of reception of the information around the current location in step S130, the flow proceeds to step S131, where whether or not the map information yet to be displayed is stored in the RAM 23 is checked. If, in step S131, the map information to be displayed next is not stored in the RAM 23, then the flow proceeds to step S132, where the information of a new predetermined area is received to update the information stored in the RAM 23 so that the image currently being displayed is connected to the next image without interruption.

On the other hand, if, in step S131, the map information to be displayed next is stored in the RAM 23, then the flow proceeds to step S133, where, on the basis of the information stored in the RAM 23, whether or not the location at which information is scheduled to be received next is in a poor-reception area that is difficult for radio waves to reach is checked. Here, a poor-reception area denotes an area where the signal strength of radio waves is weak, as at a long distance from a transmitting station, inside a tunnel, underground, in the mountains, etc., and it is assumed that map information includes information on where such areas are located. Making map information include information of poor-reception areas in this way, it is possible to check whether or not the location at which information is scheduled to be received next is in a poor-reception area. Moreover, here, the location at which information is scheduled to be received next denotes, in a case where the planned route for a destination is set, the reception location calculated as located at a predetermined distance ahead along the planned route and, in a case where no planned route is set, the reception location calculated as located at a predetermined distance along the road that the navigator 10b is currently traveling or the reception location calculated as located at a predetermined distance in the direction of travel.

If, in step S133, the location at which information is scheduled to be received next is in a poor-reception area, then the flow proceeds to step S132, where the information of a predetermined area including the poor-reception area is received and stored in the RAM 23. Here, for example, if information including a long tunnel needs to be received, it is advisable that a map on so small a scale that the amount of information can be stored in the RAM 23 be received.

In this way, when the location at which information is scheduled to be received next is located in a poor-reception area, by receiving information before communication becomes impossible, it is possible to realize a navigator 10b free from interruption of information.

It should be understood that updating of information may be performed in any other manner than by receiving information whenever there remains little information as described earlier, for example by receiving information at every predetermined distance traveled.

Figure 16:
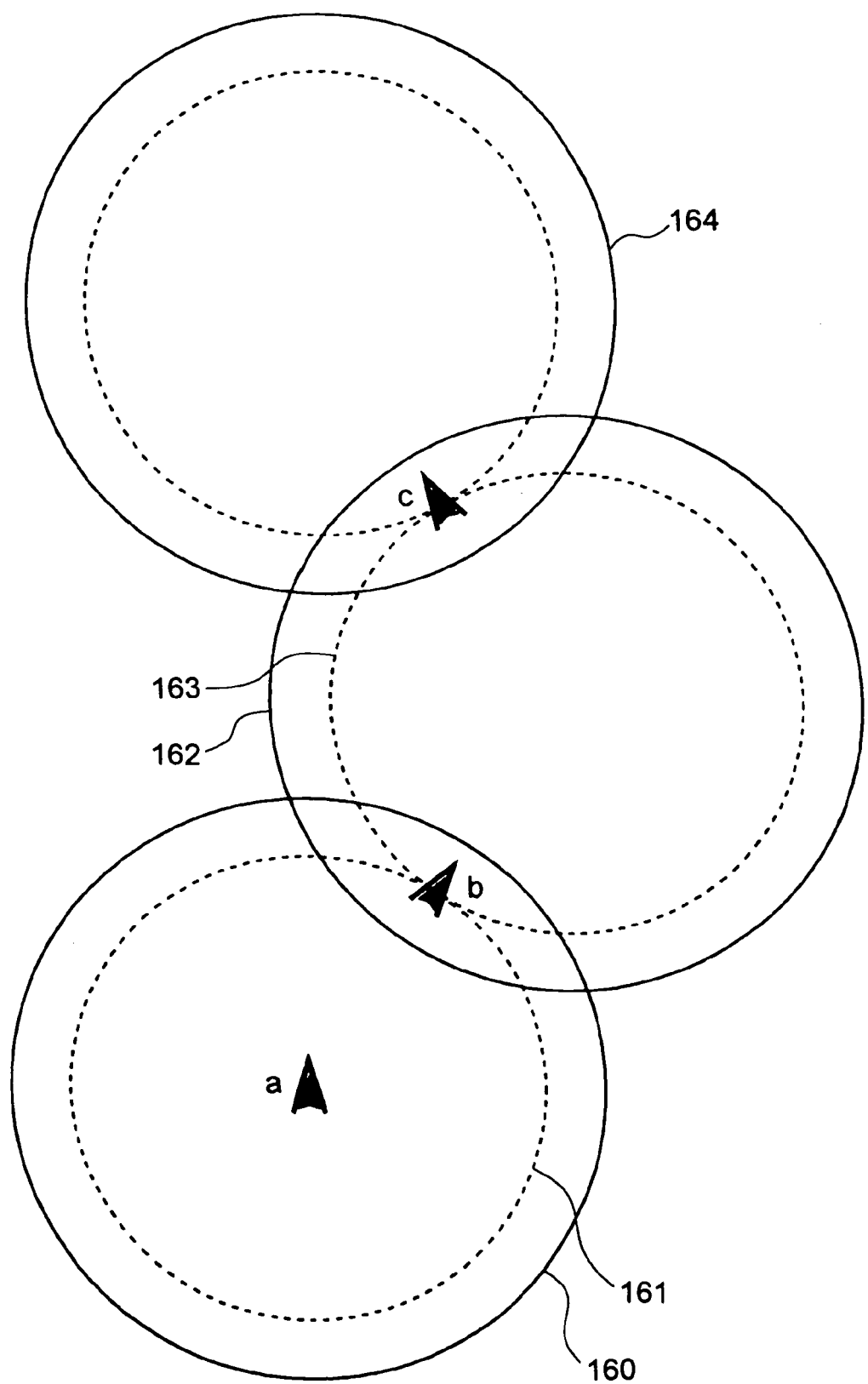
FIG. 16 is a conceptual diagram showing how information is received at every predetermined radius in the navigator of the second embodiment.

The predetermined area mentioned above may be, for example, an area extending over a predetermined radius or an area covered by a predetermined number of unit map sections. FIG. 16 is a conceptual diagram showing how, when no destination is set, information is received at every predetermined radius. In this figure, circles indicate the areas of which the information is received when a course starting at a location "a" and running through a location "b" to a location "c," each location represented by an arrow, is traveled.

First, the information of the area inside a circle 160 having its center at the location "a" and having a predetermined radius (for example, 2 km) is received. Then, when a location where the information to be displayed next runs short is reached, i.e., when the location "b" located on a broken-lined circle 161 having its center at the location "a" is reached, the information inside a circle 162 having its center at a point ahead of the location "b" and having the predetermined radius is received. Likewise, when the location "c" located on a lined-lined circle 163 and thus a location where the information to be displayed next runs short is reached, the information inside a circle 164 having its center at a point ahead of the location "c" and having the predetermined radius is received. Here, to minimize the amount of information received, it is preferable not to doubly receive the information of the overlap area between the circles 160 and 162 and of the overlap area between the circles 162 and 164.

If the locating "b" is located in a poor-reception area, the information of the area inside the circle 162 is received in advance ahead of the location "b." Likewise, if the locating "c" is located in a poor-reception area, the information of the area inside the circle 164 is received in advance ahead of the location "c."

Figure 17:
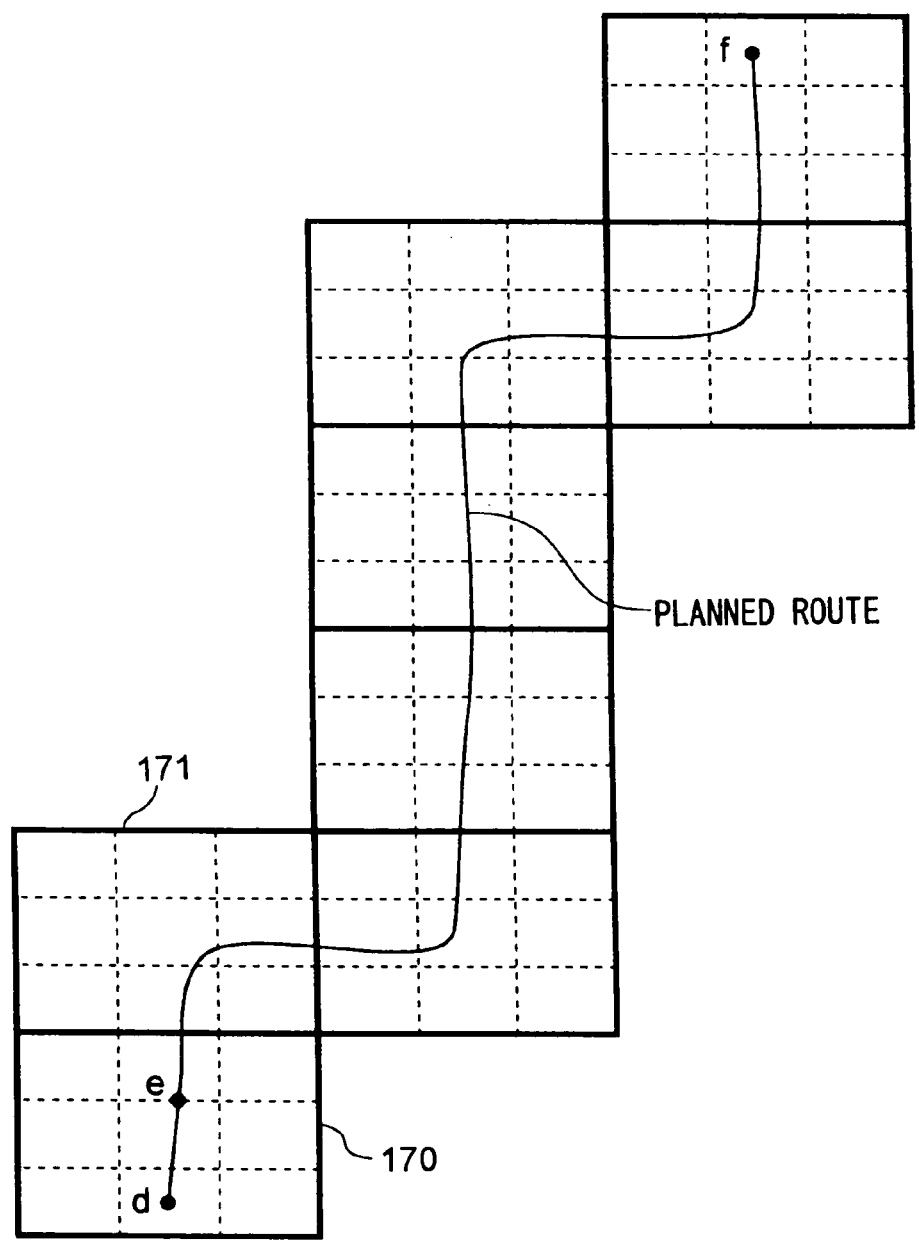
FIG. 17 is a conceptual diagram showing how information is received for every predetermined number of unit map sections in the navigator of the second embodiment.

FIG. 17 is a conceptual diagram showing how, when a destination is set and a planned route is determined, information is received for every predetermined number of unit map sections. In this figure are shown areas, in units of map sections, of which the information is received when a course starting at a location "d" and running through a location "e" to a location "f" is traveled. Here, every predetermined number of unit map sections consists of nine map sections that together form one screen.

As shown in FIG. 17, only the information of an area consisting of a predetermined number of unit map sections including the planned route is received. First, information 170 corresponding to one screen including the location "d" is received. Then, when a location where the information to be displayed next runs short, i.e., when the location "e" is reached, information 171 corresponding to one screen including the planned route which is to be displayed next is received. Likewise, information is received for one such area after another until the location "f" is reached. If the location "e" is located in a poor-reception area, the information 171 corresponding to one screen is received in advance ahead of the location "e."

EXAMPLE 4

Figure 18:
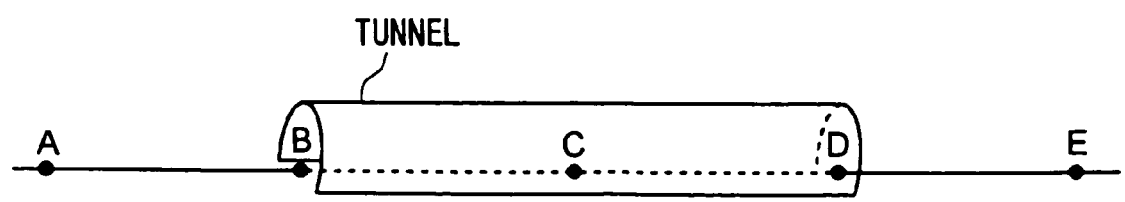
FIG. 18 is a conceptual diagram showing a planned route in the navigator of Example 4.

Next, Example 4, in which the navigator 10b described above is used, will be described. FIG. 18 is a conceptual diagram of a planned route. Suppose now that a course from a location "A" to a location "E" is currently being traveled and that the information stored in the RAM 23 was updated at the location "A." Here, it is assumed that a location "B" is located at the entrance of a tunnel, that a location "C" is the location, inside the tunnel, at which information is scheduled to be received next, the a location "D" is located at the exit of the tunnel, and a location "E" is located past the tunnel.

While the route between the locations "A" and "B" is being traveled, the information up to the location "C" has already been received at the location "A," and therefore a sufficient amount of information is stored in the RAM 23. However, since the location at which information is scheduled to be received next is the location "C," i.e., inside the tunnel, information needs to be received in advance before entry into the tunnel. Accordingly, between the locations "A" and "B." the information covering from the location "C" to the location "E" is received and stored in the RAM 23. Here, if the tunnel is so long that the storage capacity of the RAM 23 is insufficient, a map on a small scale covering at least from the location "C" to the location "D" is received and stored in the RAM 23.

In this way, by receiving information covering from the location "C" on before the location "B" is reached, i.e., before entry into the tunnel, it is possible to realize a navigator 10b free from interruption of information even past the location "C" inside the tunnel.

In the navigator 10b of the second embodiment, to prevent interruption of information in a poor-reception area, it is also possible to receive a map on a small scale whenever the signal strength is below a predetermined level. This makes it possible to realize a navigator free from interruption of information even when it encounters a poor-reception area that is not registered in map information.

The example described above deals with a case where one small map on such a scale as to include an entire poor-reception area is received before entry into the poor-reception area. It is, however, also possible to receive a plurality of maps including the poor-reception area without changing the scale so long as the storage capacity of the RAM permits.

According to the flow chart shown in FIG. 13, information is received when the location at which information is scheduled to be received next is located in a poor-reception area. It is, however, also possible to receive information in advance whenever reception is likely to be interrupted. For example, information may be received when a poor-reception area has approached within a predetermined distance of the current location.

Third Embodiment

The communications system of a third embodiment of the invention is configured in the same manner as that of the first embodiment shown in FIG. 1, and therefore its detailed explanations will be omitted.

Figure 19:
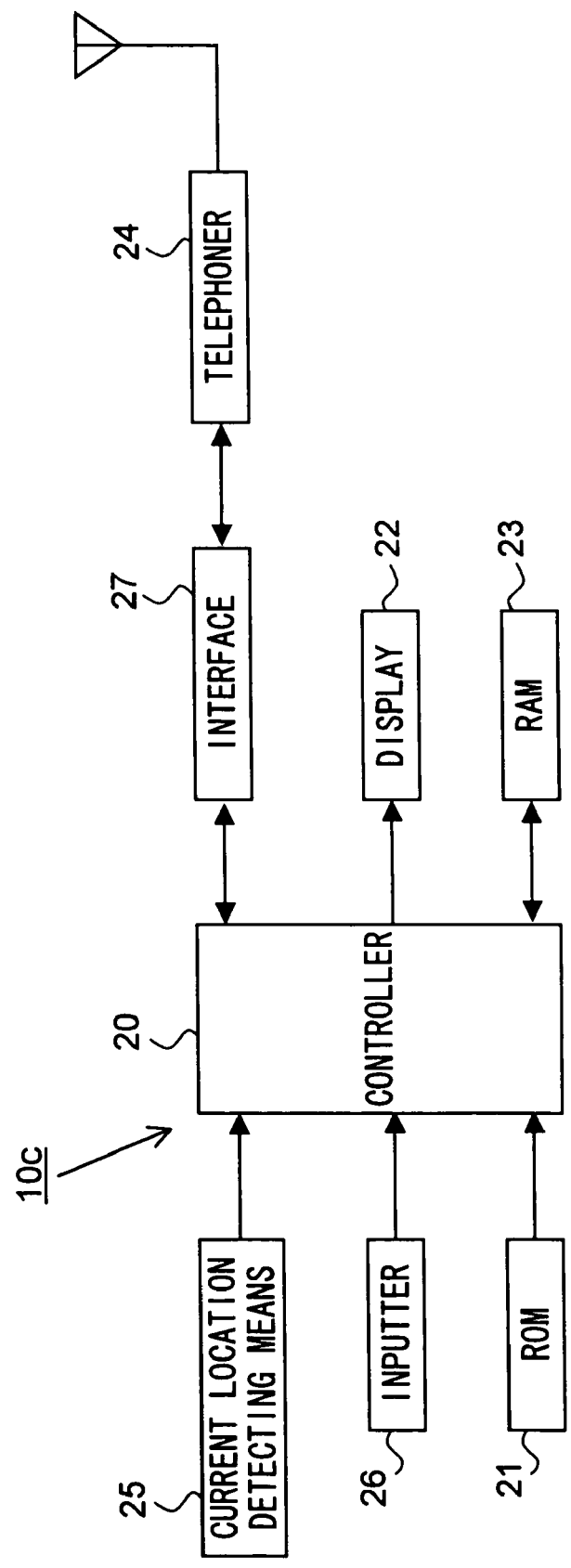
FIG. 19 is a block diagram showing the configuration of the navigator of a third embodiment of the invention.

FIG. 19 is a block diagram showing the configuration of the navigator 10c of the third embodiment. Here, such components as are found also in the block diagram showing the configuration of a principal portion of the navigator 10a of the first embodiment shown in FIG. 2 are identified with the same reference numerals, and their detailed explanations will be omitted. Here, a telephoner 24 is connected by way of an interface 27 serving as a connecting means.

Figure 20:
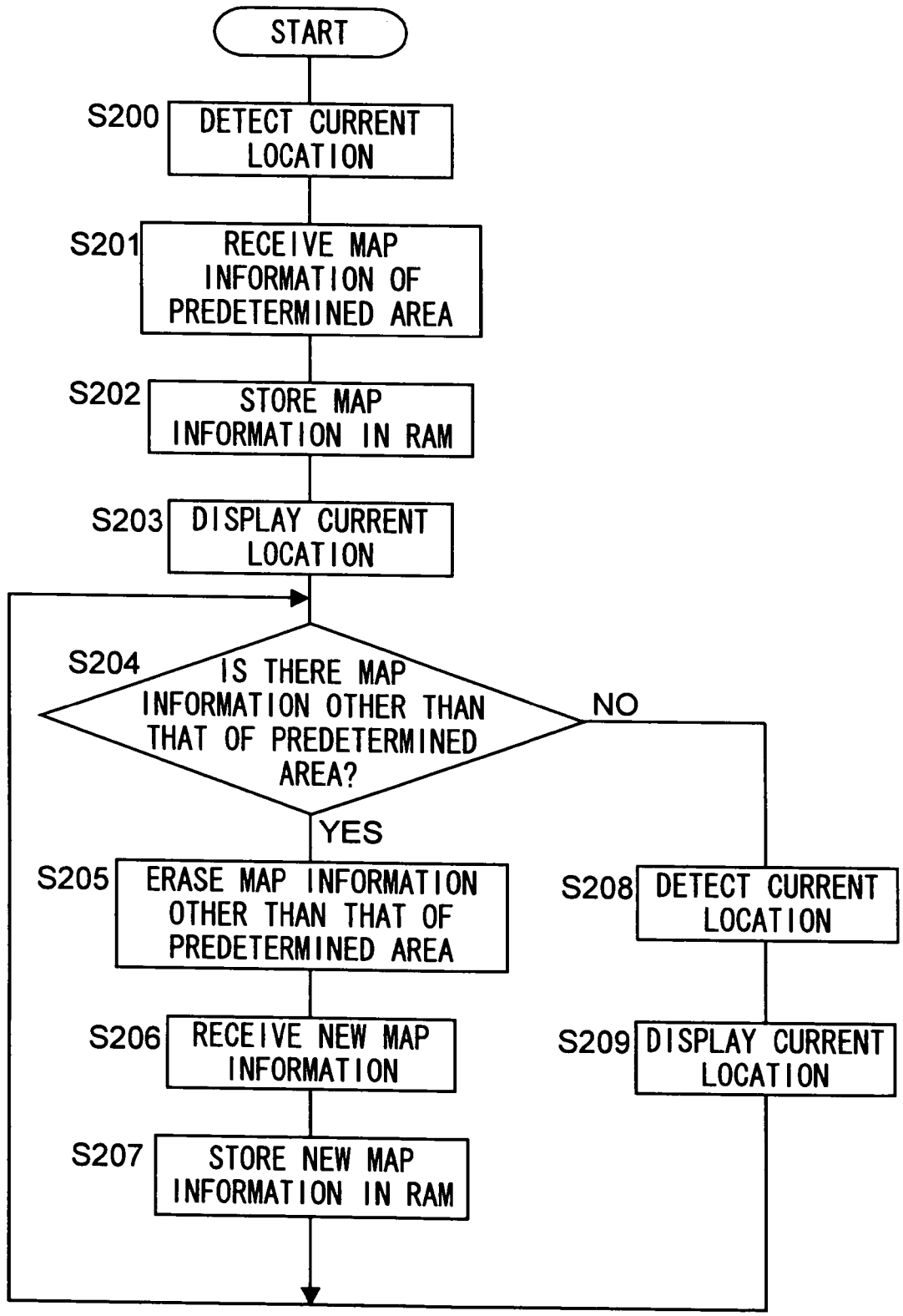
FIG. 20 is a flow chart showing the operation of the navigator of the third embodiment.

FIG. 20 is a flow chart showing the operation of the navigator 10c. First, when the navigating function is started up, in step S200, a current location detecting means 25 detects the current location. The flow then proceeds to step S201, where connection with a server 11 is established by way of the telephoner 24, and the map information of a predetermined area including the current location is received from a database 12. The flow then proceeds to step S10, where the received map information is stored in the RAM 23. Here, the predetermined area may be set in any manner so long as the amount of data covering it can be stored in the RAM 23. It is, however, advisable to set the predetermined area as large as possible so that the current location remains displayed as long as possible even in an area in which communication is impossible. The flow then proceeds from step S202 to step S203, where map information corresponding to one screen including the current location is read out from the RAM 23 and displayed with the current location superimposed thereon.

Next, the flow proceeds from step S103 to step S204, where whether or not map information other than that of the predetermined area is stored in the RAM 23 is checked. Here, map information other than that of the predetermined area includes the map information of an area other than that extending ahead of the current location and the map information of an area already traveled; that is, it denotes map information that is unlikely to be used later. If, in step S204, map information other than that of the predetermined area is stored, the flow proceeds to step S205, where the map information other than that of the predetermined area is erased from the RAM 23.

The flow then proceeds to step S206, where new map information is received so that the map information stored in the RAM 23 coincides with the predetermined area mentioned above. That is, an amount of new information comparable with the amount of information erased in step S205 is received. Here, the new map information may be map information of a continuous area including the current location and extending ahead of the current location, or may be, in a case where a destination is set in the navigator 10c, map information of a continuous area including the current location and an untraveled portion of the planned route out of all the map information covering the planned route from the current location to the destination. Next, the flow proceeds from step S206 to step S207, where the received new map information is stored in the RAM 23. Thereafter, the flow returns to step S204.

On the other hand, if, in step S204, only the map information of the predetermined area is stored, then the flow proceeds to step S208, where the current location detecting means 25 detects the current location. The flow then proceeds to step S209, where map information corresponding to one screen including the current location is read out from the RAM 23 and is displayed on the display 22 with the current location superimposed thereon. Thereafter, the flow returns to step S204.

As in the cycle from step S204 to step S209 described above, by erasing map information other than that of a predetermined area from the RAM 23 and receiving and storing only needed map information, it is possible to efficiently store map information without increasing the storage capacity. This helps keep displaying the current location longer even in an area where communication is impossible, and thus helps reduce the likeliness of map information being interrupted.

Now, Example 5, in which the navigator 10c is used with no destination set, and Example 6, in which it is used with a destination set, will be described.

EXAMPLE 5

Figure 21:
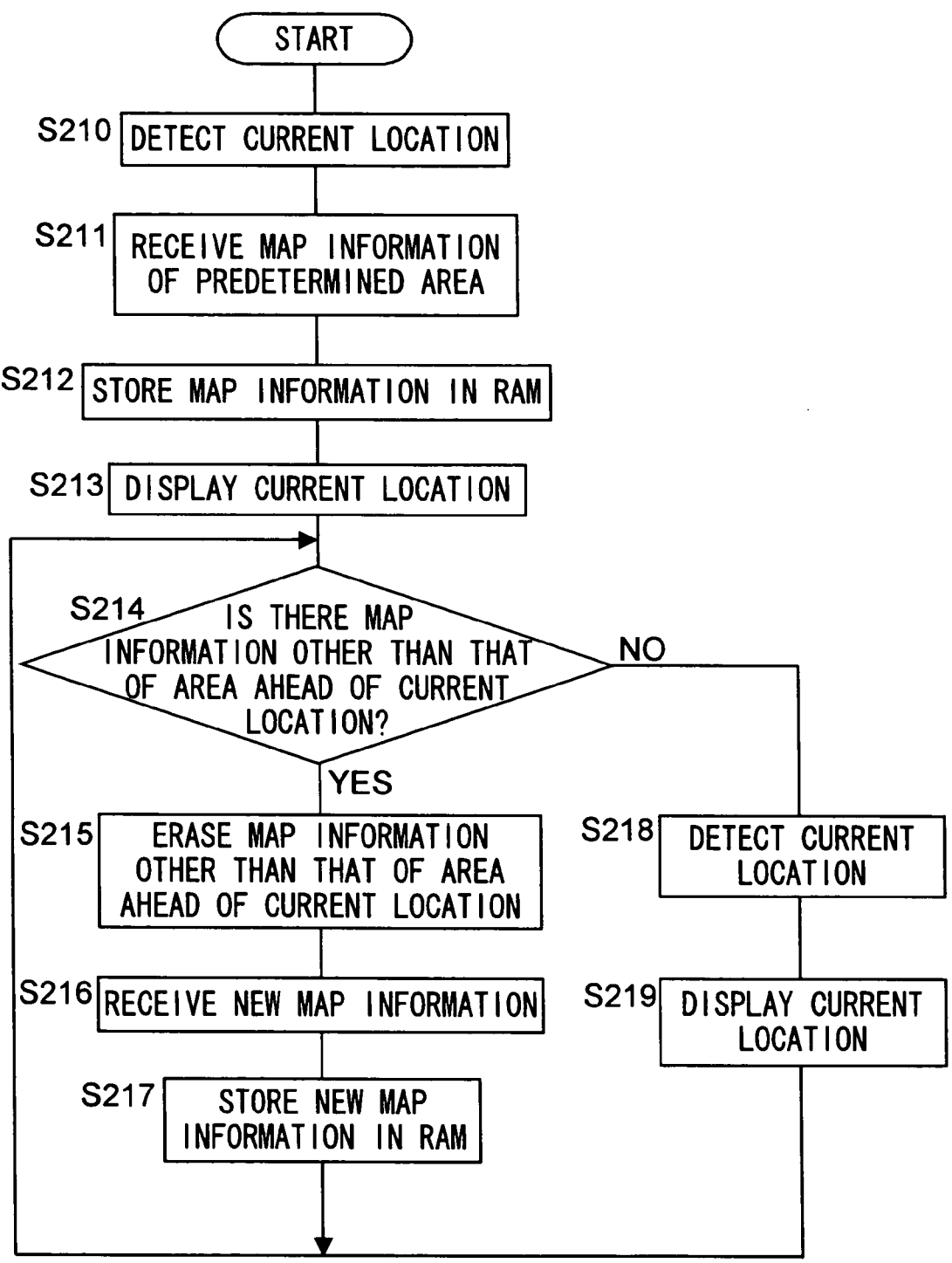
FIG. 21 is a flow chart showing the operation of the navigator of Example 5.

In a case where the navigator 10c is used with no destination set, as the current location moves, the map information around it is received and stored. FIG. 21 is a flow chart showing the operation of the navigator 10c. First, when the navigating function is started up, in step S210, the current location detecting means 25 detects the current location. The flow then proceeds to step S211, where connection with the server 11 is established by way of the telephoner 24, and map information of a predetermined continuous area including the current location and extending ahead of the current location is received. The flow then proceeds to step S212, where the received map information is stored in the RAM 23.

Figure 22:
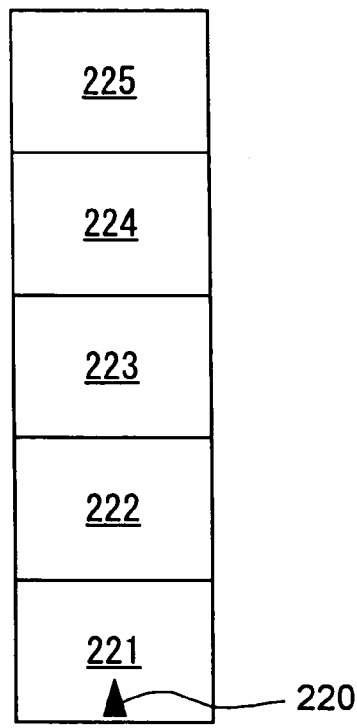
FIG. 22 is a diagram showing an image that displays the map information of a predetermined continuous area extending ahead of the current location in the navigator of Example 5.

Here, the map information of the predetermined continuous area extending ahead of the current location may be, for example, an image 221 containing the map information corresponding to one screen including the current location 220 plus images 222 to 225, contiguous with the image 221, containing the map information corresponding to a plurality of (in the figure, four) screens covering an area extending ahead of the current location. In FIG. 22, the details of the maps are omitted, and the arrow shown at the current location 220 indicates the direction ahead.

The flow then proceeds from step S212 to step S213, where map information corresponding to one screen including the current location is read out from the RAM 23, and is displayed on the display 22 with the current location superimposed thereon, in the form of the image 221 shown in FIG. 22.

Next, the flow proceeds from step S213 to step S214, where whether or not map information other than that covering an area extending ahead of the current location is stored in the RAM 23 is checked. If, in step S214, map information other than that covering an area extending ahead of the current location is stored, then the flow proceeds to step S215, where the map information other than that covering an area extending ahead of the current location is erased from the RAM 23. The flow then proceeds to step S216, where new map information is received so that the map information stored in the RAM 23 coincides with the predetermined area mentioned above. The flow then proceeds to step S217, where the received new map information is stored in the RAM 23. Thereafter, the flow returns to step S214.

Figure 23:
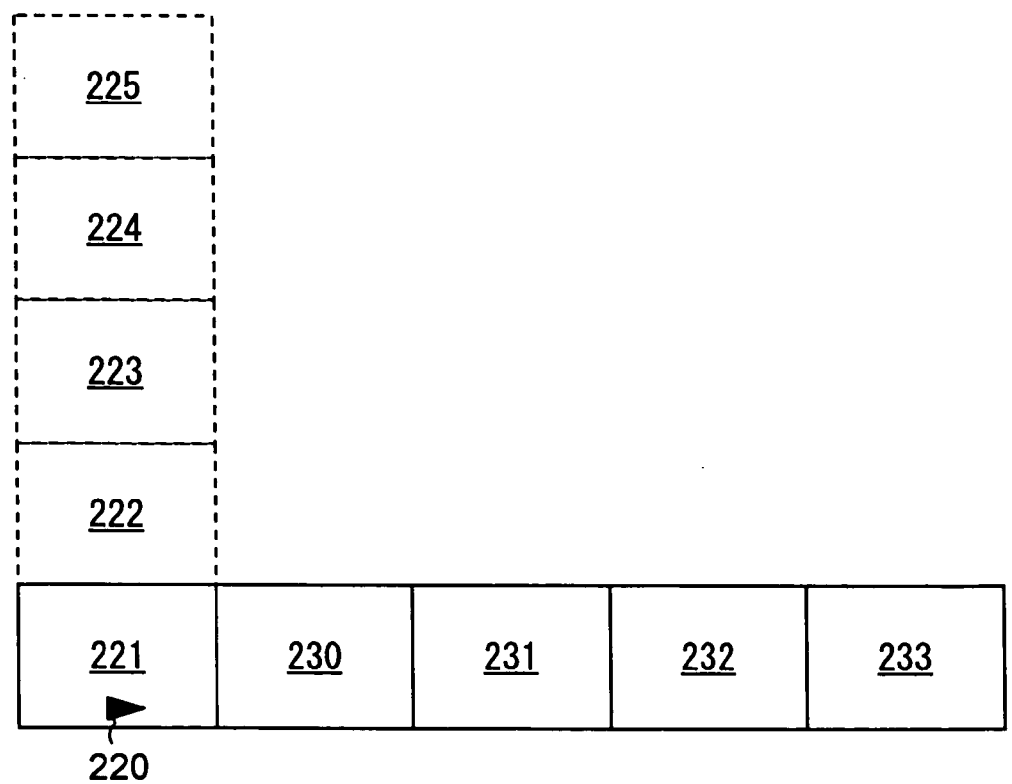
FIG. 23 is a diagram showing an image that displays the map information of a predetermined continuous area extending ahead of the current location in the navigator of Example 5.
Figure 24:
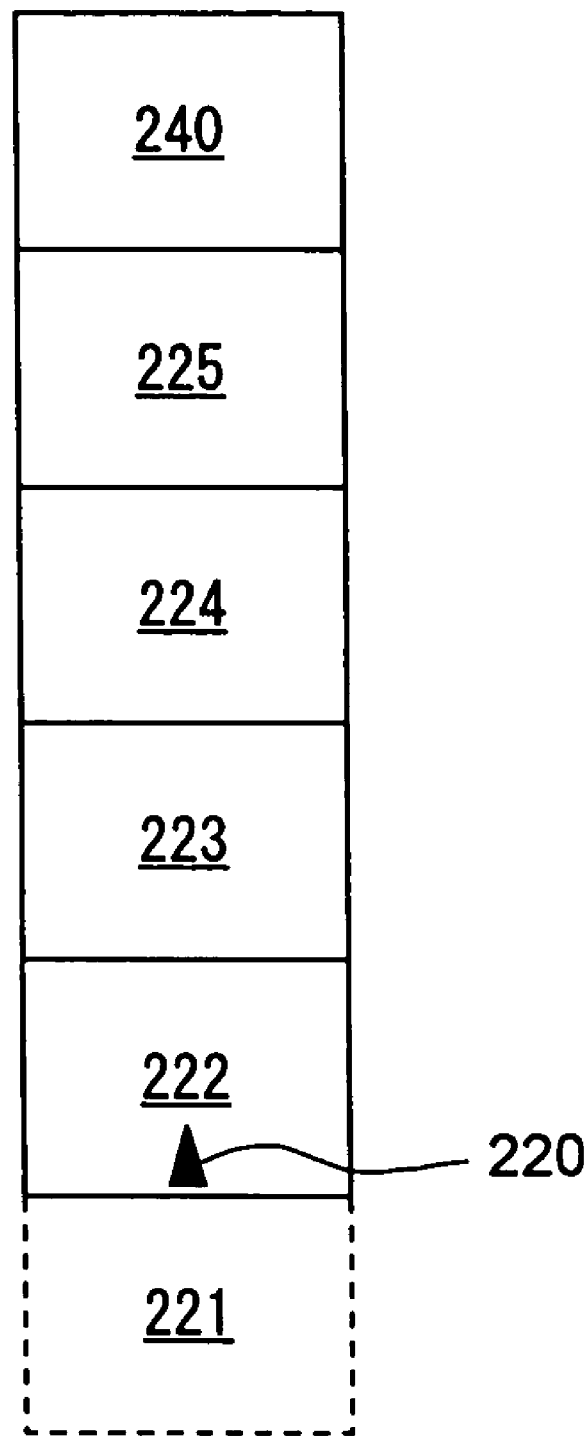
FIG. 24 is a diagram showing an image that displays the map information of a predetermined continuous area extending ahead of the current location in the navigator of Example 5.

For example, when a turn is made rightward from the state shown in FIG. 22, then, as shown in FIG. 23, the map information contained in the images 222 to 225 is no longer the map information of an area extending ahead of the current location, and is therefore erased from the RAM 23; instead, images 230 to 233 containing the map information that now covers an area extending ahead of the current location is newly received and stored in the RAM 23. By contrast, when no turn is made from the state shown in FIG. 22 until the image 222 is reached, then, as shown in FIG. 24, the map information contained in the image 221 is no longer the map information of an area extending ahead of the current location, and is therefore erased from the RAM 23; instead, an image 240 containing unreceived map information of an area extending ahead of the current location is newly received and stored in the RAM 23.

On the other hand, if, in step S214, only the map information of an area extending ahead of the current location is stored, then the flow proceeds to step S218, where the current location detecting means 25 detects the current location. The flow then proceeds to step S219, where map information corresponding to one screen inducing the current location is read out from the RAM 23 and is displayed on the display 22 with the current location superimposed thereon. Thereafter, the flow returns to step S214.

In this way, by keeping only the map information of an area extending ahead of the current location stored in the RAM 23 all the time, it is possible to efficiently store map information without increasing the storage capacity. This helps keep displaying the current location longer even in an area where communication is impossible, and thus helps reduce the likeliness of map information being interrupted.

EXAMPLE 6

Figure 25:
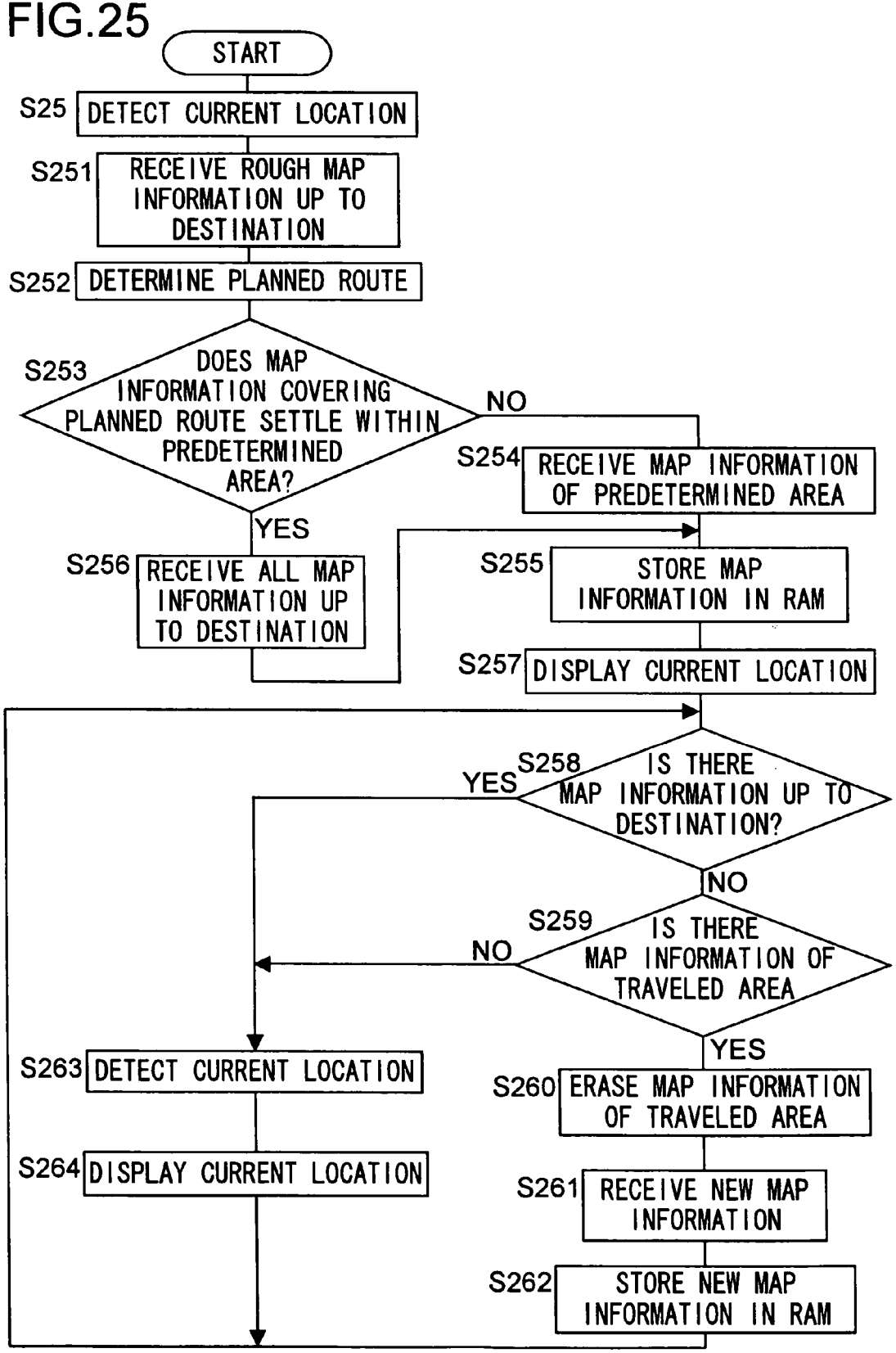
FIG. 25 is a flow chart showing the operation of the navigator of Example 6.

In a case where the navigator 10c is used with a destination set, the map information covering the planned route from the current location to the destination is received and stored one portion after another. FIG. 25 is a flow chart showing the operation of the navigator 10c. First, when the navigating function is started up and a destination is entered through operation of the inputter 26, then, in step S250, the current location detecting means 25 detects the current location. The flow then proceeds to step S251, where rough map information covering from the current location to the destination is received.

Then, the flow proceeds from step S251 to step S252, where, on the basis of the received map information, a planned route is determined. The flow then proceeds to step S253, where whether or not the map information covering the planned route from the current location to the destination settles within a predetermined area is checked. Here, the predetermined area means the amount of information that can be stored in the RAM 23. If, in step S253, the map information covering the planned route from the current location to the destination exceeds the predetermined area, then the flow proceeds to step S254, where connection with the server 11 is established by way of the telephoner 24, and the map information of the predetermined continuous area including the current location and a portion of the planned route is received. The flow then proceeds to step S255, where the received map information is stored in the RAM 23.

On the other hand, if, in step S253, the map information covering the planned route settles within the predetermined area, then the flow proceeds to step S256, where all the map information covering the planned route from the current location to the destination is received. The flow then proceeds to step S255, where the received map information up to the destination is stored in the RAM 23.

Figure 26:
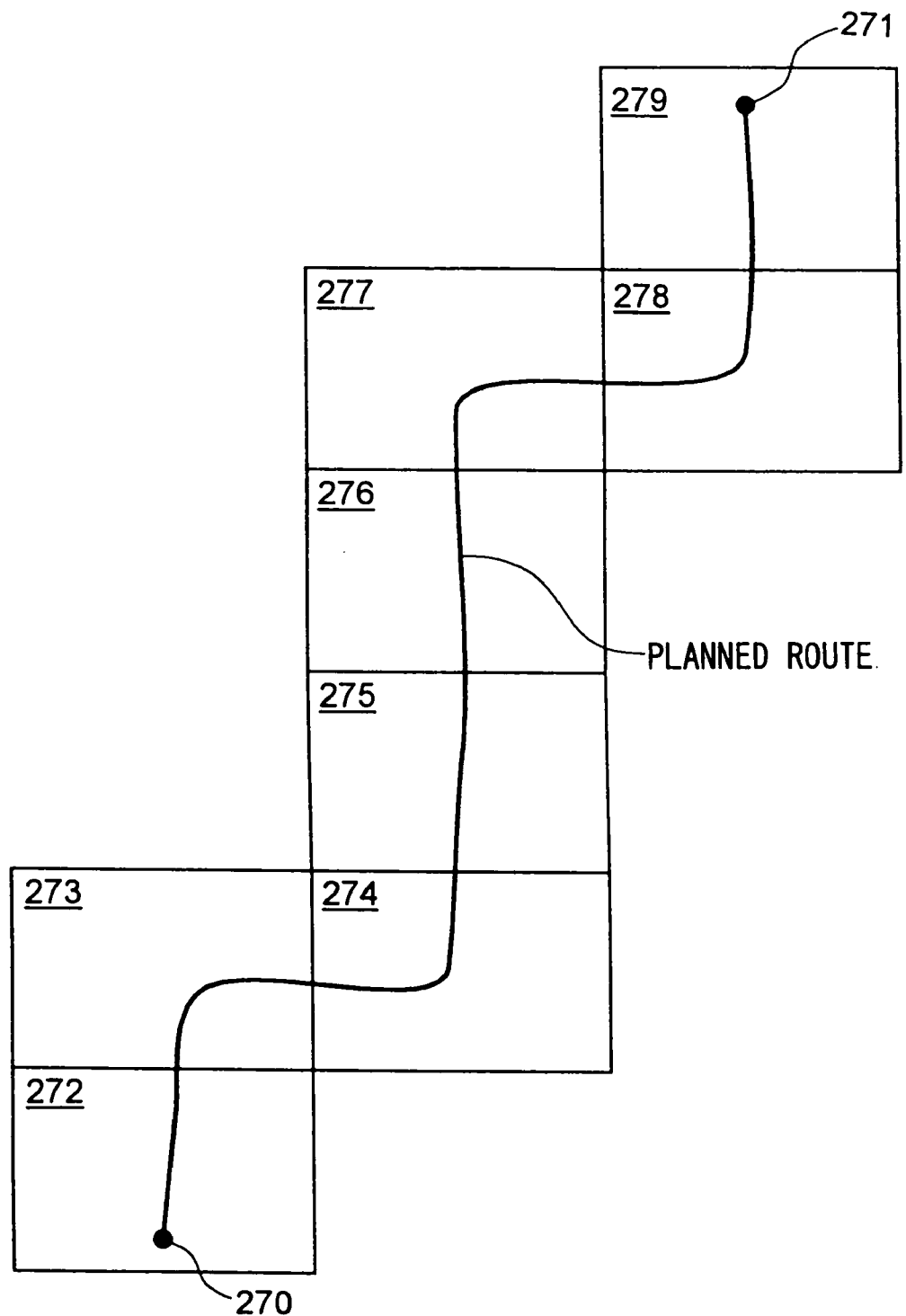
FIG. 26 is a diagram showing an image that displays the map information covering the planned route from the current location to the destination in Example 6.

Here, the map information covering the planned route from the current location to the destination, for example as shown in FIG. 26, consists of an image 272 containing the map information corresponding to one screen including the current location 270 plus images 273 to 279, contiguous with the image 272, containing the map information covering the planned route up to the destination 271. In FIG. 26, the map is omitted except for the planned route. For example, if, in step S253, the predetermined area corresponds to five screens, then, in step S254, the map information corresponding to the images 272 to 276 is received; if the predetermined area corresponds to ten screens, then, in step S256, all the map information corresponding to the images 272 to 279 is received.

The flow then proceeds from step S255 to step S257, where map information corresponding to one screen including the current location is read out from the RAM 23 and displayed on the display 22 with the current location superimposed thereon.

Next, the flow proceeds from step S257 to step S258, where whether or not the map information up to the destination is stored in the RAM 23 is checked. If, in step S258, the map information up to the destination is not stored, then the flow proceeds to step S259, where whether or not there is map information of an already traveled area is checked.

If, in step S259, there is map information of an already traveled area, then the flow proceeds to step S260, where the map information of an already traveled area is erased from the RAM 23. The flow then proceeds to step S261, where new map information is received so that the map information stored in the RAM 23 coincides with the predetermined area. The flow then proceeds to step S262, where the received new map information is stored in the RAM 23. Thereafter, the flow returns to step S258.

On the other hand, if, in step S258, the map information up to the destination is stored, or if, in step S259, there is no map information of an already traveled area, then the flow proceeds to step S263, where the current location detecting means 25 detects the current location. The flow then proceeds to step S264, where map information corresponding to one screen including the current location is read out from the RAM 23 and displayed on the display 22 with the current location superimposed thereon. Thereafter, the flow returns to step S258.

For example, in FIG. 26, in a case where the predetermined area corresponds to five screens, when the current location moves from the image 272 to the image 273, of all the images 272 to 276 stored in the RAM 23, the image 272 is erased, and instead the image 277 is newly received and stored in the RAM 23. Likewise, when the current location moves from the image 273 to the image 274, the image 273 is erased and instead the image 278 is received and stored; when the current location moves from the image 274 to the image 275, the image 274 is erased, and instead the image 279 is received and stored. Next, when the current location moves from the image 275 to the image 276, the image 279 containing the map information including the destination 271 has already been stored, and therefore no new map information is received.

In this way, by storing only the map information of a predetermined area covering the planned route from the current location to the destination while constantly erasing the map information of an already traveled area, it is possible to efficiently store map information without increasing the storage capacity. This helps keep displaying the current location longer even in an area where communication is impossible, and thus helps reduce the likeliness of map information being interrupted.

Example 6 may be applied in a case where no planned route is set. Specifically, the road having the name of the road currently being traveled is regarded as the planned route, and only the map information covering the road currently being traveled is received and stored. In this case, the controller 20 of the navigator 10c operates according to the flow chart shown in FIG. 25 with the destination set at that end of the road having the name of the road currently being traveled which is located ahead.

Incidentally, when the telephoner 24 is located outside the communicable area and thus communication is impossible, it is impossible to receive new map information. Even then, as soon as communication becomes possible again, new map information is received and stored so that the map information stored in the RAM 23 coincides with the predetermined area.

The scale on which the navigator of the third embodiment receives map information may be automatically determined by the navigator itself on the basis of the width of the road passing at the current location, the current speed, and other factors. Alternatively, the user may be permitted to set a desired scale. When the scale of map information is changed during the use of the navigating function, it is advisable to erase the stored map information and receive and store map information on the changed scale.

INDUSTRIAL APPLICABILITY

A navigator according to the present invention can be incorporated not only in a car-mounted or portable navigation apparatus but also in a communication apparatus such as a cellular phone for convenient use.

The invention claimed is:

1. A navigator including receiving means for receiving map information through communication, displaying means for displaying the map information received by the receiving means with a current location superimposed thereon, and controlling means for controlling the receiving means and the displaying means,
   wherein, based on a judgment made by the controlling means,
       the receiving means receives, out of map information composed of a plurality of maps on different scales, the map information on a smallest scale among maps that show type of road at the current location or the map information on a smallest scale among maps that show type of road of a planned route, and
       the displaying means displays the map information and the current location in a superimposed form, and
   wherein, when there is a branch point within a predetermined area ahead of the current location, the receiving means receives the map information on a largest scale among maps including the current location and the branch point, and the displaying means displays the map information and the current location in a superimposed form.

2. A navigator as claimed in claim 1, wherein, the branch point is a turning point on the planned route.

3. A navigator including receiving means for receiving map information and locality information through communication, displaying means for displaying the information received by the receiving means with a current location superimposed thereon, and controlling means for controlling the receiving means and the displaying means, wherein, based on a judgment made by the controlling means, the navigator operates in one of:
 a first state in which the receiving means receives, out of map information composed of a plurality of maps on different scales, the map information on a smallest scale among maps that show type of road at the current location or the map information on a smallest scale among maps that show type of road of a planned route, and the displaying means displays the map information and the current location in a superimposed form; and
 a second state in which the receiving means further receives locality information corresponding to the map information, and the displaying means displays the map information, the locality information, and the current location in a superimposed form, and wherein, when there is a branch point within a predetermined area ahead of the current location, the receiving means receives the map information or the locality information on a largest scale among maps including the current location and the branch point, and the displaying means either displays the map information and the current location in a superimposed form or displays the map information, the locality information, and the current location in a superimposed form.

4. A navigator as claimed in claim 3 wherein, the branch point is a turning point on the planned route.

* * * * *